(12) United States Patent
Santodomingo et al.

(10) Patent No.: US 7,414,629 B2
(45) Date of Patent: Aug. 19, 2008

(54) AUTOMATIC SCENERY OBJECT GENERATION

(75) Inventors: Victor Santodomingo, Redmond, WA (US); Jason M. Dent, Seattle, WA (US); Jason L. Waskey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/079,129

(22) Filed: Mar. 8, 2005

(65) Prior Publication Data

US 2005/0171754 A1 Aug. 4, 2005

Related U.S. Application Data

(63) Continuation of application No. 10/096,189, filed on Mar. 11, 2002, now Pat. No. 7,038,694.

(51) Int. Cl.
*G06T 7/40* (2006.01)
(52) U.S. Cl. ..................................................... 345/582
(58) Field of Classification Search .................. None
See application file for complete search history.

(56) References Cited

U.S. PATENT DOCUMENTS

| | | | | |
|---|---|---|---|---|
| 4,821,212 A * | 4/1989 | Heartz | ......................... | 345/426 |
| 4,970,682 A * | 11/1990 | Beckwith et al. | ............... | 707/1 |
| 5,604,849 A | 2/1997 | Artwick et al. | ............. | 345/423 |
| 5,651,676 A | 7/1997 | Artwick | ...................... | 434/43 |
| 5,790,123 A * | 8/1998 | Wald et al. | ................... | 345/419 |
| 5,949,425 A * | 9/1999 | Willis | .......................... | 345/428 |
| 5,974,423 A * | 10/1999 | Margolin | ..................... | 345/606 |
| 6,229,546 B1 * | 5/2001 | Lancaster et al. | ........... | 345/419 |
| 6,456,288 B1 * | 9/2002 | Brockway et al. | ........... | 345/428 |
| 6,747,649 B1 * | 6/2004 | Sanz-Pastor et al. | ........ | 345/428 |
| 6,961,055 B2 * | 11/2005 | Doak et al. | .................. | 345/419 |
| 6,985,903 B2 * | 1/2006 | Biacs | .......................... | 707/100 |
| 7,050,050 B2 * | 5/2006 | Tackett | ....................... | 345/419 |

OTHER PUBLICATIONS

Microsoft Flight Simulator 2000. Oct. 21, 1999. http://www.answers.com/topic/microsoft-flight-simulator-2000?cat=entertainment.*
Tips for a more realistic Flight Simulator 2000 experience. 2003. http://www.microsoft.com/italy/games/flightsimulator/fs2000_articles_scenicFS.asp.*

(Continued)

*Primary Examiner*—Ulka Chauhan
*Assistant Examiner*—Peter-Anthony Pappas
(74) *Attorney, Agent, or Firm*—Workman Nydegger

(57) ABSTRACT

Data defining one or more graphic objects, such as buildings and vegetation, are automatically generated in a repeatable manner within each of a plurality of visual tiles of a simulated space. A seed is determined for a tile as a function of a location of the tile in the space. The seed is used to pseudo-randomly determine visually apparent characteristics of the graphic objects, such as position, height, and texture. A tile is preferably characterized by one or a combination of texture classes, such as vegetated and urban. Any tile can be associated with an annotation that specifies other characteristics of an object, such as its footprint, or of a sub-area within which objects will be depicted in the tile and rendered with the randomly determined characteristics. For multi-class tiles, the annotations are used to mask automatically generated graphic objects from undesired portions of the tile.

23 Claims, 16 Drawing Sheets

OTHER PUBLICATIONS

Softlang Software and Allen Kriesman, Inc. 2000. "Terramodels for Fly II." 3 pp. Available http://avsim.com/terramodels/.

Chenney, Stephen. Terrain Generation. 2001 http://www.cs.wisc.edu/~schenney/courses/cs638-f2001/lectures/cs638-14.ppt.

Dutton, Geoffrey. 1991. Zenithial Orthotriangular Projection.: In Technical Papers 1991 ACSM-ASPRS Annual Convention, 6 (Auto Carto 10) pp. 77-95. Baltimore, MD.

Hammes, Johan. 2001. "Modeling of Ecosystems as a Data Source for Real-time Terrain Rendering." Digital Earth Moving, 2001. First International Symposium. 13 pgs. Available https://www.cimsi.cim.ch/dem2001/.

Nineteenseventyfive. "Natural World Terrain Manager." N.d., 8 pgs. Available http://www.mzone.mweb.co.za/residents/jhammes/products.htm, Feb. 27, 2002.

3D Nature, LLC. "What is Visual Nature Studio?" n.d., 3 pgs. Available http://www.3dnature.com/vnsinfo.html. Retrieved from the Internet Jan. 15, 2008.

Microsoft Corporation; Developed by Zipper Interactive, Inc. 2000. 00Prior Art—Screen Print from Crimson Sckies Game. 1 pg. Available http://microsoft.com/games/crimsonskies/. Retrieved from the Internet Jan. 15, 2008.

Ubi Soft Entertainment ; Developed by 1C: Maddox Games (of Russia). 2001. Prior Art—IL-2 Sturmovik Game. 11 pgs. Available http://gamespot.com/gamespot/filters/products/screens/0,11105,354449-167,00.html.

Eidos Interactive. Ltd; Developed by Innerloop Studies (A Vision Park Company). 1997. Prior Art—Joint Strike Fighter Game. 1 pg. Available https://www.innerloop.no/projects/jsf/jsf_shots17.jpg.

Natural Graphics. "Natural Scene Designer 2.0" 1999. 2 pgs. Available http://www.macaddict.com/issures/9910/rev.nsdesinger2.html.

Flight One Software, Inc. "FS Traffic=A Busy As It Gets." 2001. 2 pp. Available http:/flight1.com/products.asp?product=JFL-FST-001. Retrieved from the Internet Jan. 15, 2008.

TerraGear. Using VMap0 for Flight Gear Scenery, n.d. 2 pgs. Available http://www.terragear.org/docs/vmap0/. Retrieved from the Internet Jan. 15, 2008.

\* cited by examiner

AUTOMATIC SCENERY OBJECT GENERATION

RELATED APPLICATIONS

This application is a continuation of a patent application, Ser. No. 10/096,189, filed on Mar. 11, 2002 now U.S. Pat. No. 7,038,694, the benefit of the filing date of which is hereby claimed under 35 U.S.C. § 120.

FIELD OF THE INVENTION

The present invention generally relates to automatically creating data for scenery in a computer simulation, and more specifically, pertains to dynamically generating data for graphical objects associated with a composite mask of textures to populate a perceptible region of the computer simulation.

BACKGROUND OF THE INVENTION

Computer simulations, such as computer games and other applications that include a virtual environment, often include background scenery to enhance the simulation. It is common to utilize simple color patterns and/or other texture data to represent a terrain or other background. Such background is often repetitively tiled while a simulated character, or other element, moves about relative to the background in the simulation. Typically, these simple backgrounds are only two-dimensional (2D), and are not very realistic. However, some 2D backgrounds have complex textures and may be designed to be computationally efficient in covering a large area in a simulated virtual environment.

To increase the realism of a simulation, three-dimensional (3D) scenery objects are sometimes used instead of, or in addition to, 2D backgrounds. For example, it is common to include 3D buildings, walls, vegetation, and other scenery objects in computer games. To provide even more realism, a well-known or easily recognized scenery object, such as a landmark building, may be mapped to a specific location within the simulated environment corresponding to the location of the real object in the environment. With this technique, some simulations are able to provide very detailed scenery objects, but because of the labor involved, the detail is confined within a relatively limited area. For instance, some automobile racing games include very detailed scenery objects that correspond to real buildings, traffic signs, trees, and other objects along some selected streets of cities in which auto races are held.

However, even with foreseeable increases in processor speeds and storage sizes, it is impractical to define, store, and render a specific scenery object for every corresponding real object over a wide area, such as an entire metropolitan area. The problem becomes even more significant when the simulated environment includes the entire Earth. Thus, in prior art simulated virtual environments, 3D scenery objects are often used to simulate specific landmarks in a few limited areas, while 2D terrain background is typically used in the remaining larger areas of the simulation. For example, as indicated above, it is common to provide 3D simulations of specific landmark buildings in the center of a metropolitan area, and use 2D terrain background in the outskirts of the metropolitan area.

However, it would generally be desirable to provide more realistic 3D scenery everywhere within a simulated environment. One method that has been employed in the prior art is to enhance the 2D terrain background with topographical data, thereby creating the appearance of a 3D terrain, such as mountainous areas. Although an improvement, topographical data typically provides only a smoothed representation of a continuous region, such as uninhabited, hilly areas. Smoothing is not well suited for realistically depicting individual scenery objects, such as buildings, individual trees or other vegetation, and other discrete objects.

Another method used in the prior art simply adds 3D scenery objects that do not correspond to any real objects. Exact replication of a real object is thus not usually necessary, or even possible. In many cases, it is sufficient to provide scenery objects that appear realistic, but do not necessarily represent real objects. For example, it is often sufficient to simulate buildings, vegetation, and other 3D scenery objects in the outskirts of a simulated metropolitan area without replicating those objects in the outskirts of the real metropolitan area. Similarly, where real objects cannot be replicated, such as in games on fictitious worlds, it is necessary to simulate scenery objects independently. For example, vegetation and terrain objects that do not replicate reality can appear realistic in a simulation of dinosaurs, or a simulation of a fictitious planet, even though there is no corresponding real object to reference.

For such cases, some alternatives are available. One alternative is to populate the scenery with objects stored in a library. A variety of library objects can be randomly or programmatically selected and rendered at various locations in the simulation. Another alternative is to dynamically generate scenery objects based on stored parameters, such as building height, width, and depth. The scenery objects can be randomly or programmatically generated and rendered at various locations in the simulation.

However, rendering scenery objects at various locations does not take advantage of the repetitive efficiencies of a 2D background. Instead, each scenery object is typically created in the simulation independent of, or layered atop the 2D background. In particular, a scenery object may be selected from a library or generated from parameters and placed at a specific position independent of an underlying 2D background. Alternatively, a scenery object may be selected from a library or generated from parameters based on the type of 2D background that has been applied. For example, if an urban 2D background is to be used, then more buildings than trees may be selected or generated and placed over the 2D background. The specific locations of objects may be predetermined, determined from a stored pattern, randomly determined, or programmatically determined. However, without further detailed knowledge of the content of the 2D background, unexpected results can occur. For instance, a building might be placed so that it overlies a road in the 2D background.

Existing systems that automatically generate 3D scenery objects also typically do not enable a user to control how the 3D scenery objects are provided. There are scenery editors available, but these editors normally require a user to define a scenery object offline. Offline scenery editors do not enable dynamically changing a scenery object so as to provide a variety of similar scenery objects for use in other locations in a simulated environment while a simulation program is running. Instead of requiring a designer to manually create each object that is placed at a specific position in a simulated environment, it would instead be preferable to enable a user to simply set parameters that control how a variety of scenery objects are dynamically created for use in the simulated environment. (Note that the terms "designer" and "user" are used interchangeably herein.)

It would also be desirable to enable a user to annotate 2D backgrounds to define appropriate locations for dynamically created scenery objects. For example, it would be desirable to annotate aerial photos to indicate where real buildings exist, and let the simulation automatically generate a variety of appropriate realistic buildings that will appear at those annotated locations. This approach is needed to make the scenery appear realistic, because the result will correspond to the actual terrain, but will not require the user to exactly replicate buildings at each location at which they appear in the computer simulation.

An important application for such an approach is in creating realistic terrain over which aircraft fly in a flight simulator program. An initial use of this concept thus occurred as part of Microsoft Corporation's FLIGHT SIMULATOR 2002™ product, which was publicly disclosed in 2001. Subsequently, others appear to have recognized the value of automatically generating a variety of scenery objects that are related to the underlying 2D terrain texture in a simulated environment and have released similar products. For example, a freeware product called TERRAMODELS, produced by Sofflang Software and Allen Kriesman, Inc., reportedly generates scenery objects to populate the background landscape in a flight simulator program called FLY II™, which is sold by Terminal Reality, Inc. However, this concept was apparently not used in the prior art.

SUMMARY OF THE INVENTION

In connection with the present invention, a method and system are provided for automatically generating data in a repeatable manner, so that the data define a graphic object within a visual tile used as one of a plurality of such visual tiles, to represent a simulated space. The data define graphic objects, such as vegetation objects, structures, animals, obstructions, vehicles, and/or fictitious objects. In the past, tiles have been used to populate a background, but unless many different tiles are created, the repetitive nature of the tiles is relatively apparent, since a repeated identical visual pattern of tiles is typically easy to detect. To generate the objects in a visual tile in a repeatable manner that does not appear repetitive, the present invention employs different seed values for the visual tiles. A seed value is determined as a function of a location of the visual tile in the simulated space. Based upon the seed value, a visually apparent characteristic of the graphic object is pseudo-randomly generated. For example, the visually apparent characteristic can include the position of a graphic object within the tile, the height of the graphic object, a texture of the graphic object, and/or other attributes. Since the same seed value is used for a visual tile, each time the tile is used, identical data are employed to define the visually apparent characteristic. As a result, the visual tile appears the same each time it is rendered, but it differs from other visual tiles because the scenery on it are determined in part by the randomly generated visually apparent characteristic(s).

A level of resolution of the tile may also be used to set or adjust the seed value. The level of resolution is preferably determined by successively subdividing the simulated space into successively smaller tiles, so that the level of resolution corresponds to a selected level of subdivision of the simulated space. The simulated space may be a planet, a geographic region, a structure, a pathway, a virtual environment, a fictitious space, or almost any other space that may be electronically portrayed. A visual tile of the simulated space may be populated with multiple graphic objects as a function of the seed value and dependent upon a selected density value.

Preferably, the visual tile is characterized by a consistent type of class. Examples of class types include a vegetated, an uninhabited, an unoccupied, an uninterrupted, or a fictitious type of class. A consistent class type generally enables graphic objects to be positioned anywhere in the tile. Classes refer to an underlying texture that provides a visual tile with a 2D environment and include grasslands, forests, tundras, mountains, deserts, prairies, agricultural areas, savannas, suburban areas, urban areas, fluid surfaces, subsurface areas, walls, fictitious terrains, and other types of environments. Each visual tile preferably provides a continuity along its edges in regard to adjacent visual tiles so that the boundary between visual tiles is not evident as a distinct line and the space filled with a plurality of visual tiles appears continuous.

Another aspect of the present invention is directed to a method and system for automatically generating data defining a graphic object within a visual tile by associating the tile with an annotation that specifies a characteristic of the object. For example, the characteristic can be the position of the object within the tile, a dimensional area defining a footprint of the object, or an area within the tile where that objects will lie. A different parameter that affects a visual appearance of the object is determined pseudo-randomly. The different parameter may include a height of the object, a texture of the object, or a specific position of the object within an annotated area. The different parameter may be pseudo-randomly determined from a seed as a function of the tile location and a resolution level. The annotation and parameter are included in the data defining the object within the visual tile.

In many cases, a visual tile will include a mixture of background textures, such as a combination of forest and suburban scenery. Preferably, the first texture applied to the tile is masked with a second texture to create a composite texture. The method then determines whether an annotation associated with the first texture is disposed within a portion of the second texture. If so, the automatically generated object will be excluded in that portion, so as not to appear "out of place." For example, if an annotation for an automatically generated building indicates that the building should be generated in an area of the tile that corresponds only to a forest texture, the building will be excluded from that forested area of the visual tile. Similarly, if an annotation for an automatically generated building indicates that the building should be generated in an area of the tile that corresponds to a predefined landmark building, such as the Empire State Building, the automatically generated building will be excluded.

Preferably, exclusions are determined with the aid of a composite mask of the visual tile. The composite mask represents the combination of textures that is based on classes of the textures overlapping on the tile, such as the combination of forest and suburban textures noted above. After determining the classes of texture that affect the visual tile, the classes are prioritized to determine a general pattern of the texture classes to be applied to the visual tile. From the general pattern, one or more specific masks are selected to create a composite mask that combines the textures in a realistic manner. The multiple textures are then applied to the tile according to the composite mask. With the composite mask, automatically generated objects are displayed in appropriate areas of the visual tile.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
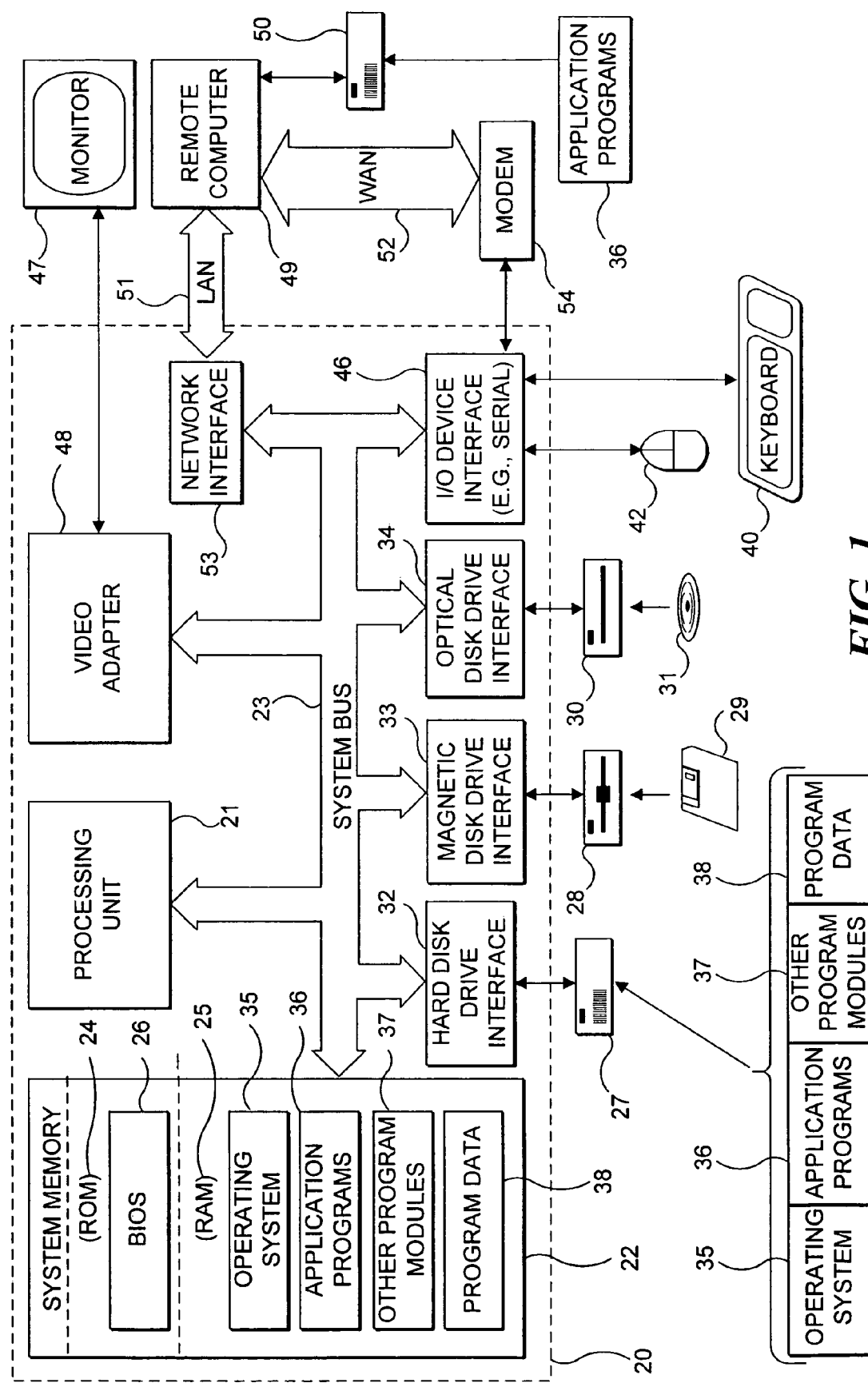
FIG. 1 is a block diagram of an exemplary system for implementing the present invention, using a general purpose computing device in the form of a conventional personal computer (PC)

FIG. 1 and the following discussion are intended to provide a brief, general description of a suitable computing environment in which the present invention may be implemented. The invention may be practiced on a single computing device, but can also be practiced on a client computing device coupled in communication with a server and/or one or more other remote computing devices over a communication network. Both the client computing device and the server will typically each include the functional components shown in FIG. 1. Although not required, the present invention will be described in the general context of computer executable instructions, such as program modules that are executed by a PC. Generally, program modules include application programs, such as computer simulations, routines, objects, components, functions, data structures, etc. that perform particular tasks or implement particular abstract data types. Also, those skilled in the art will appreciate that this invention may be practiced with other computer system configurations, particularly in regard to a client device for executing computer simulations, including game consoles, hand-held devices, pocket personal computing devices, digital cell phones adapted to execute simulations and to wirelessly connect to a network, other microprocessor-based or programmable consumer electronic devices, multiprocessor systems, network PCs, minicomputers, mainframe computers, and the like. The present invention may also be practiced in distributed computing environments, where tasks are performed by remote processing devices that are linked through a communications network. In a distributed computing environment, program modules may be located in either or both local and remote memory storage devices.

With reference to FIG. 1, an exemplary system for implementing the present invention includes a general purpose computing device in the form of a conventional PC 20, which is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown) and may include a magnetic disk drive 28 for reading from or writing to a removable magnetic disk 29, and an optical disk drive 30 for reading from or writing to a removable optical disk 31, such as a CD-ROM or other optical media Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein includes a hard disk, removable magnetic disk 29, and removable optical disk 31, it will be appreciated by those skilled in the art that other types of computer readable media, which can store data that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into PC 20 through input devices such as a keyboard 40 and a pointing device 42. Pointing device 42 may include a mouse, stylus, wireless remote control, or other pointer. Other input devices (not shown) may include a joystick, game pad, wheel, pedal, microphone, satellite dish, scanner, digital camera, digital video recorder, or the like. These and other input/output (I/O)

devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, the simulated environment provided by the present invention, and/⁶r other information. In addition to the monitor, PCs are often coupled to other peripheral output devices (not shown), such as speakers (through a sound card or other audio interface (not shown)) and printers.

As indicated above, the invention may be practiced on a single computing device; however, PC 20 may operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface, for establishing communications over WAN 52. One type of WAN commonly used for communication is the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Exemplary Embodiment

Figure 2:
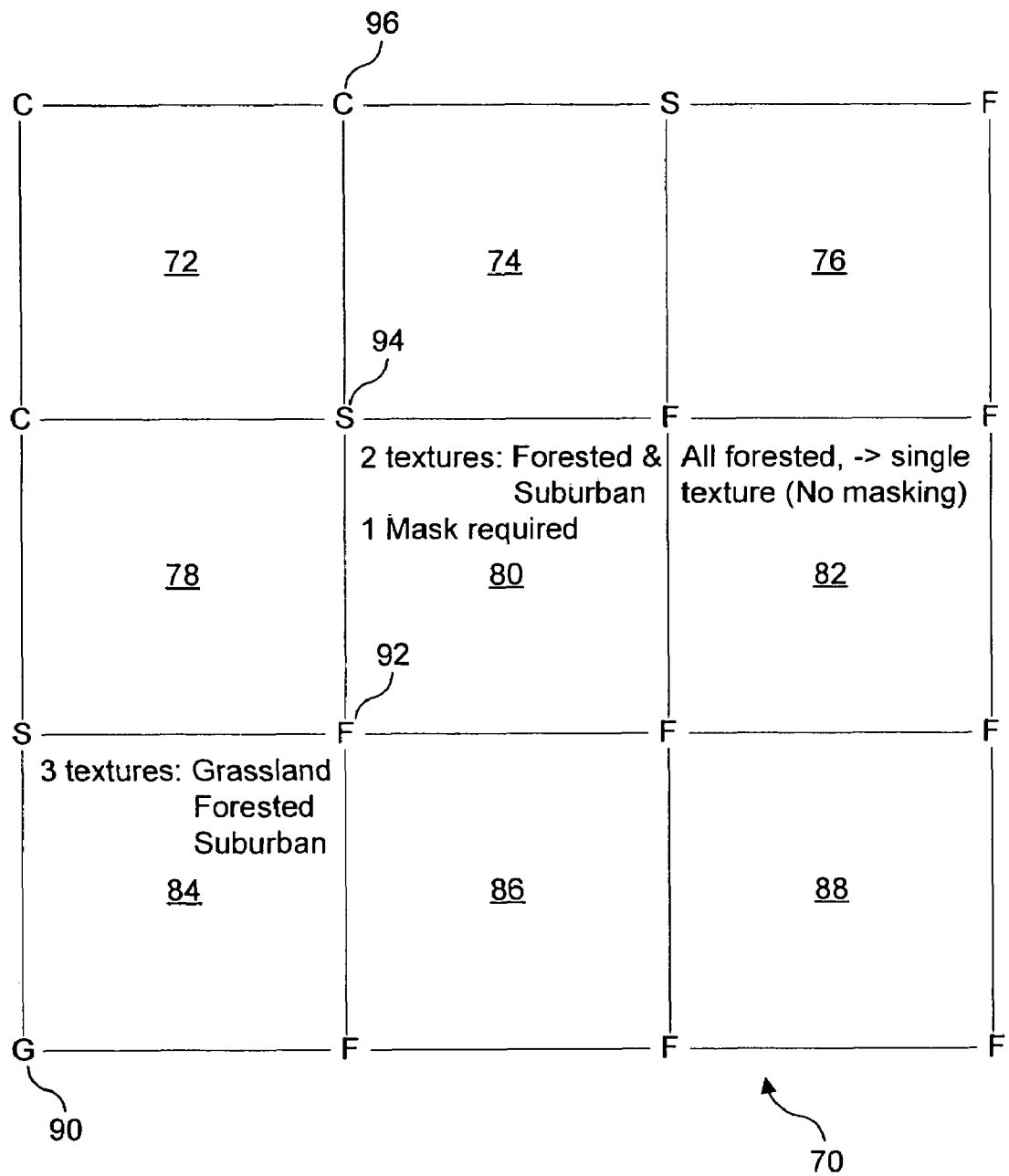
FIG. 2 (Prior Art) is a schematic diagram showing several tiles of different classes that illustrate terrain classification data in the form of a terrain class map comprising multiple tiles.

A preferred embodiment of the present invention was initially developed as an automatic scenery generator to produce landscape as a background for aircraft flying in a flight simulator program, Microsoft Corporation's FLIGHT SIMULATOR 2002™. In this exemplary embodiment, the invention makes use of previously developed underlying terrain data and automatically generates scenery objects that overlay the terrain data. To better understand the relationship between the scenery objects and the underlying terrain, it is instructive to discuss how the underlying terrain data were developed and previously used in earlier versions of the flight simulator product. Much of the underlying terrain data includes terrain classifications that cover the entire Earth. For example, portions of the Earth's surface are covered by grasslands, forests, deserts, tundras, farmlands, mountains, oceans, lakes, etc. Other portions are covered by small towns, suburbs, and urban cities. A number of organizations, including the United States Geological Survey (USGS at http://www.usgs.gov/), provide such terrain classification data FIG. 2 illustrates how the prior art terrain classification data are indicated on a terrain class map 70 for a small portion of the earth's surface that includes tiles 72-88. Each tile in this example corresponds to a specific geographic area, designated by a latitude and longitude. Generally, each tile corresponds to a specific area, such as a square kilometer. However, in a more general sense, each tile may instead correspond to any desired subdivision of an area, where the degree of subdivision is determined by a desired level of resolution. For example, before being subdivided, a single very large tile can represent the surface of the entire Earth. This state corresponds to a level-1 resolution, or a level-1 tile. In most cases, a single tile is not very useful, because it has too little resolution. However, the single level-1 tile may be subdivided into four equal regions to create four, level-2 tiles. Similarly, each of the four regions may be divided into four more tiles to create a total of 16, level-3 tiles. A level-15 tile happens to correspond to approximately one square kilometer of the Earth's surface near the $45^{th}$ parallel (i.e., at 45 degrees latitude). The level of resolution can be increased, if desired, and can be used to control scenery resolution at various distances from the surface, such as at various flight altitudes in this application of the present invention. This technique also enables the use of tiles in a more versatile fashion over any type of surface, such as a fictitious world, a simulated wall, or other surface that is not measured in regard to a position on the Earth's surface, or its surface area. However, it is acknowledged that this technique was used in prior versions of applicant's flight simulator product and is therefore part of the prior art.

Using the terrain classification data, each corner of a tile is identified with a terrain class that identifies the type of terrain in the adjacent corners of the adjoining four tiles sharing that corner. For example, the lower left corner (i.e., the southwest corner) of tile 84 is designated as a grassland terrain class 90. As suggested above, other examples include a forest terrain class 92, a suburban terrain class 94, and a city terrain class 96. The terrain classes designated at the corners of a tile are used to establish a 2D scenery texture for the tile. A texture may be derived from a digital aerial photograph or other graphical rendition of a desired surface for the tile.

A single scenery texture can be used for a tile with all four corners designated with the same terrain class. For example, all four corners of tile 82 are designated as forest. Thus, tile 82 can be rendered with a single scenery texture that represents a forest. Tiles 86 and 88 can also be rendered with a single scenery texture that represents a forest. Preferably, however, a number of graphically designed texture variations of the same terrain class are provided, so that different texture variations can be applied to adjacent tiles that have the same terrain class without creating a surface on which a repeating patch of exactly the same texture is evident. Accordingly, tiles 82, 86, and 88 will each be rendered with a different variation of the forest scenery texture, such that they each appear somewhat different, yet appear continuous at the edges of the tile, even if adjoining a tile with a different class of scenery terrain used as a texture.

Other tiles include multiple terrain classes at the corners and require a combination of scenery textures. For instance, three corners of tile 80 are designated as forest, while the upper left corner is designated as suburban. In this case, a forest scenery texture is combined with a suburban scenery texture to produce a composite texture. Similarly, tile 84 requires combining a grassland scenery texture, a forest scenery texture, and a suburban scenery texture. Scenery textures are combined by masking the scenery textures in a prioritized order according to terrain class. In the example of FIG. 2, grassland terrain class is considered a low priority, such that it is applied first and overlaid by the higher priority scenery textures of forest, suburb, and city, respectively. Those skilled in the art will recognize that many more and different terrain classes are possible, and the order or priority may be changed as desired.

To overlay a lower priority scenery texture, a mask is applied to a higher priority scenery texture. The mask is preferably the same size as a tile, and is generally configured according to the corner location(s) of the higher priority terrain class. For example, tile 80 includes a suburban terrain class in the upper left corner (i.e., the northwest corner). After a forest scenery texture is applied to the tile, a mask is used that allows the upper left corner of a suburban scenery texture to overlay or overwrite the forest scenery texture.

Figure 3:
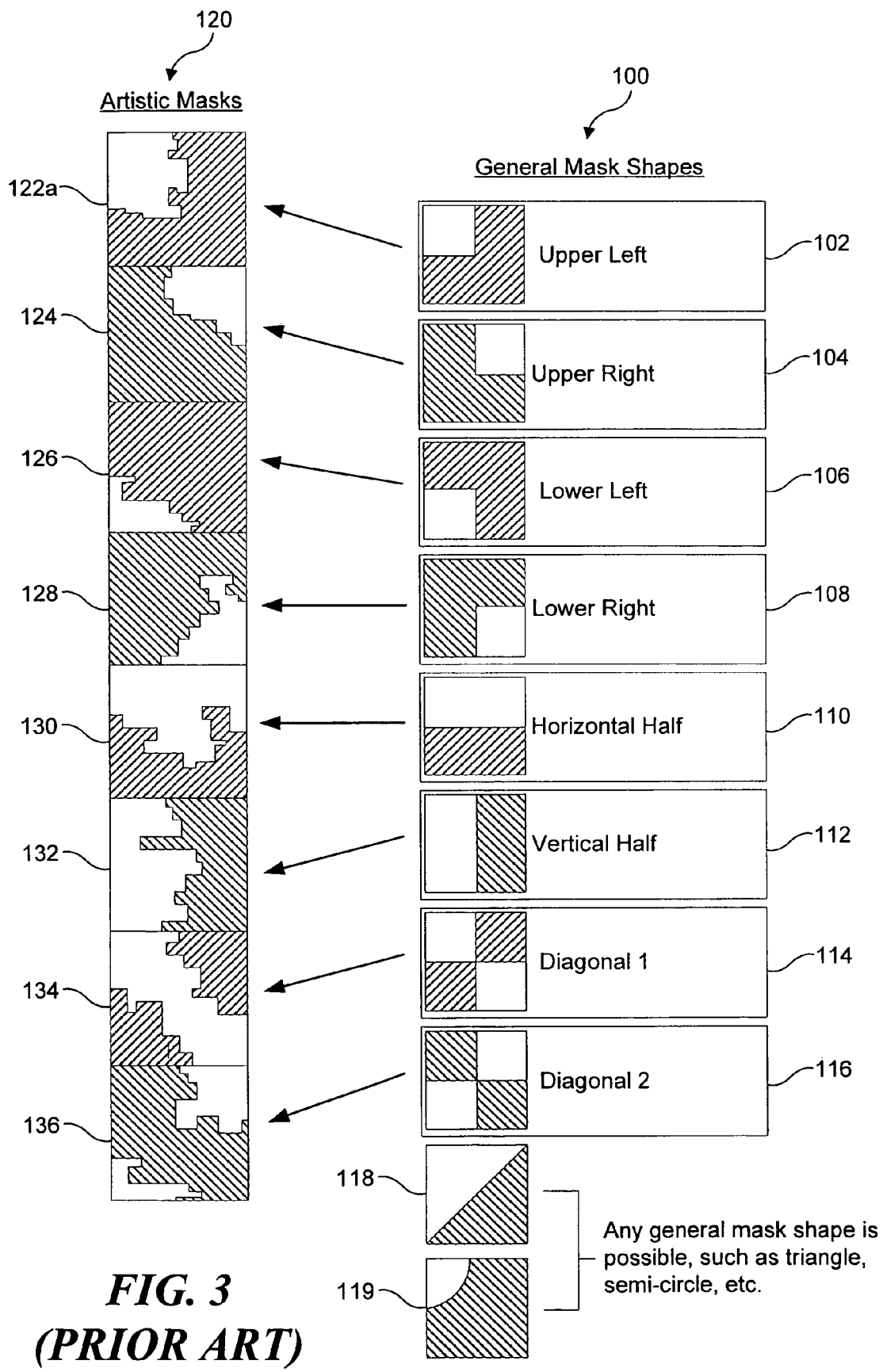
FIG. 3 (Prior Art) is a schematic diagram illustrating a sample set of general masks for combining scenery textures in a tile.

FIG. 3 illustrates how a set of masks are employed for combining scenery textures in a tile. A representative set 100 of general mask shapes 102-116 indicate a terrain class relationship in regard to one or more corners of a tile. In the example discussed above, general upper left mask shape 102 can be used to provide a suburban terrain class in the upper left corner of tile 80 in FIG. 2. Those skilled in the art will recognize that many other general mask shapes are possible to indicate a relationship of terrain class to corners of a tile. For example, a triangular shape of general mask shape 118 of FIG. 3 or a semicircular shape of general mask shape 119 may be used instead of the square shape of general mask shape 102. However, to provide even more realistic scenery texture, these general mask shapes are preferably artistically enhanced to provide a corresponding set 120 of artistic masks 122a-136 in which the border of the masked area is made more irregular or "random" in appearance. It will be understood that even more artistic variations can be provided than shown in these artistic masks. One or more artistic mask is then applied according to the terrain classes designated at the corners of a tile.

Figure 4:
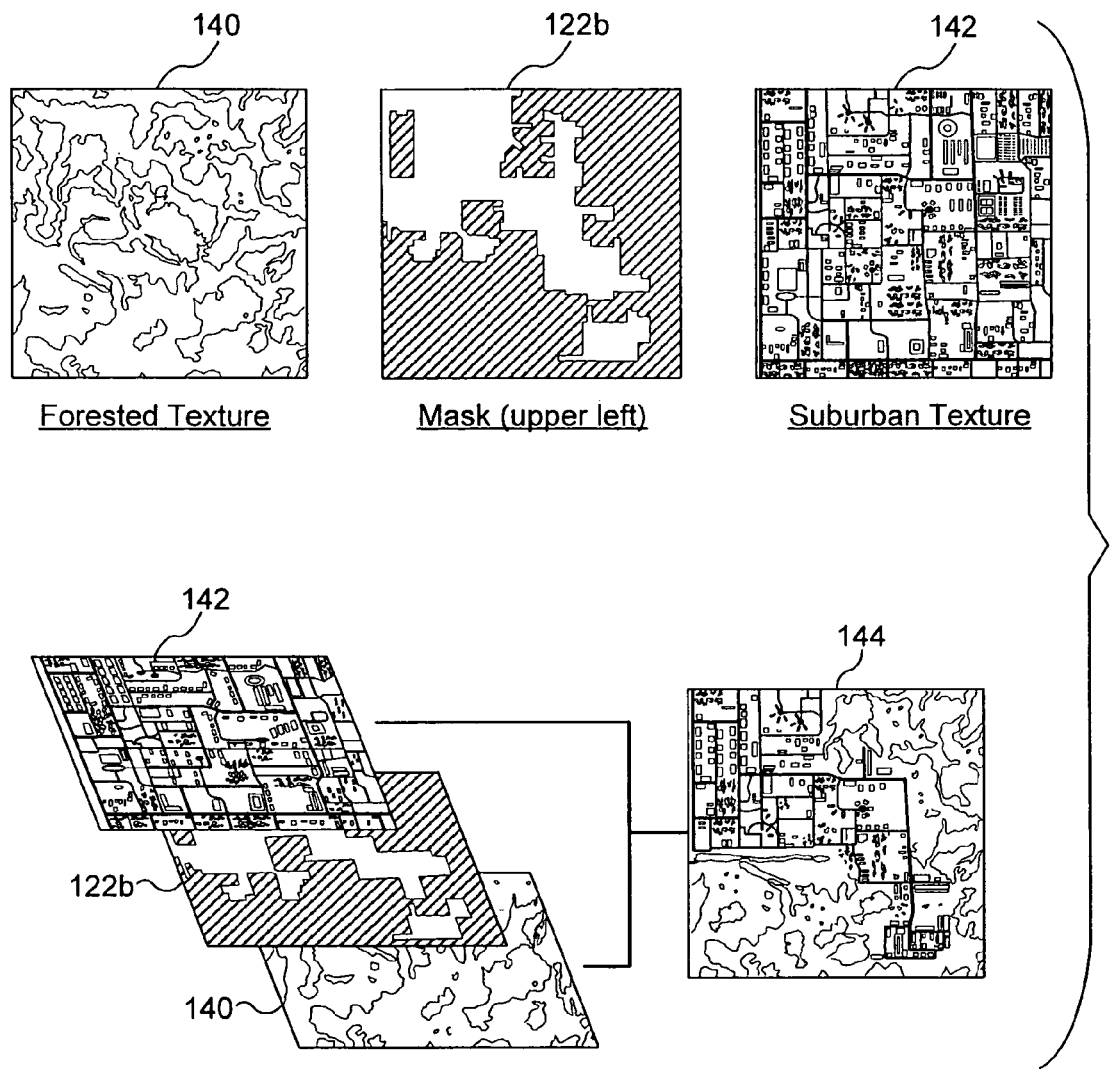
FIG. 4 (Prior Art) is a schematic diagram illustrating an exemplary application of an artistic mask to produce a composite scenery texture.

FIG. 4 illustrates an exemplary application of an artistic mask to produce a composite scenery texture. A forest texture 140 and a suburban texture 142 are typically stored as bit maps. Forest texture 140 is retrieved and loaded into memory first, since a forest terrain class is considered to have a lower priority than a suburban terrain class. An artistic mask 122b is preferably defined in an array of two different values. One value, such as zero (0), represents the lower priority texture (e.g., the forest texture). The second value, such as one (1), represents the higher priority texture (e.g., the suburban texture). Where the second value is detected in the array of the mask, the suburban texture overlays or overwrites the forest texture in memory. This selective overwriting produces a composite scenery texture 144. Note that a mask can be reversed, simply by interchanging the zero and one values in the array (or there effect).

More complex texturing can also be done with additional masks and terrain textures. Preferably, a composite mask is formed from the masks that need to be applied. The composite mask is also preferably defined in an array, but comprises multiple values, corresponding to the priority of each terrain texture to be applied (e.g., 0, 1, or 2). The composite mask may also be modified to reflect specific locations of other textures. For example, the composite mask may include a series of values defining a line that represent a river or a road. The use of masks in this manner corresponds to prior art, because this approach was used in the previous versions of the flight simulator product. However, the composite mask can also be used to determine whether a 3D scenery object will be displayed on the tile.

Figure 5A:
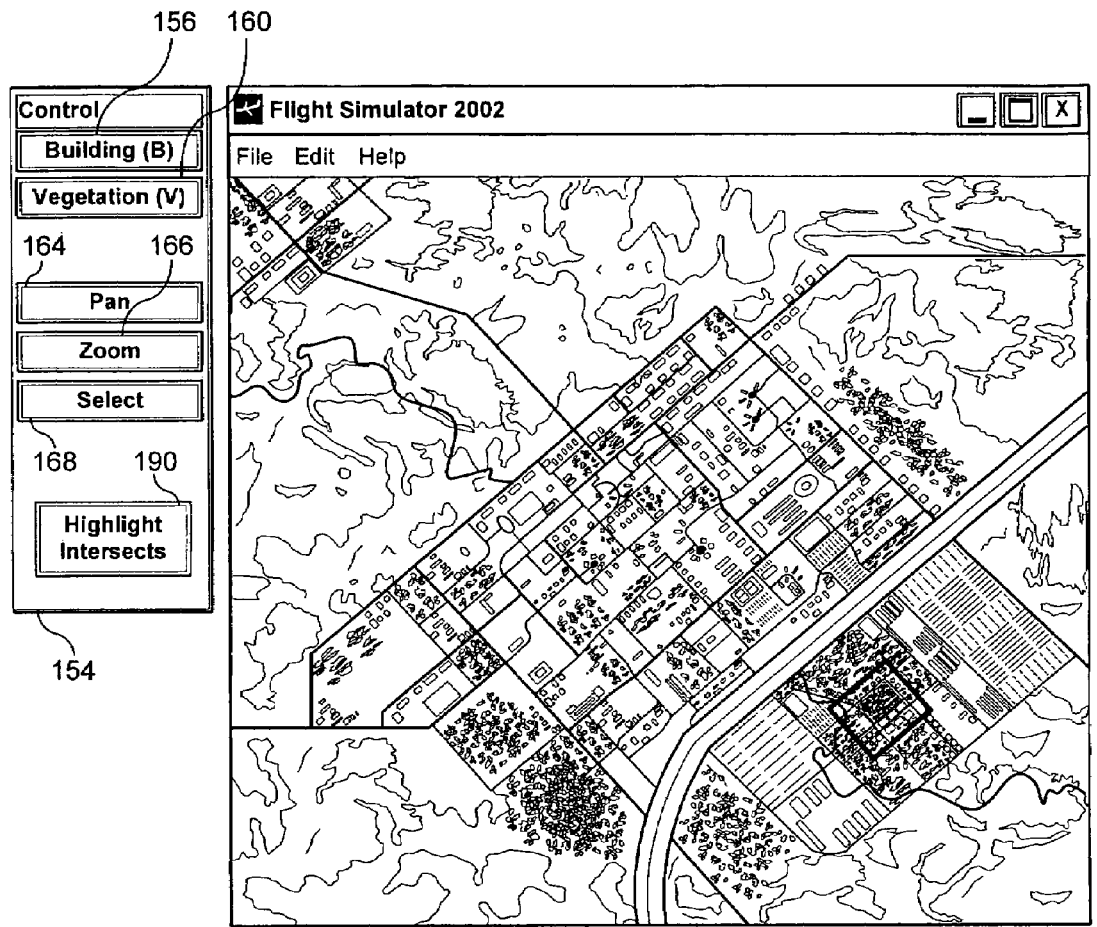
FIG. 5A is a dialog window showing how an annotation tool is employed for defining 3D scenery objects.

FIG. 5A illustrates an annotation tool 150 for defining 3D scenery objects. In general, a terrain texture 152 is annotated to indicate where scenery objects are to be generated on the terrain texture. A designer can employ functions available through a control panel 154 to annotate and view the selected terrain texture. For instance, the designer may use a building function 156 to indicate where a building object should be located in the terrain texture.

Figure 5B:
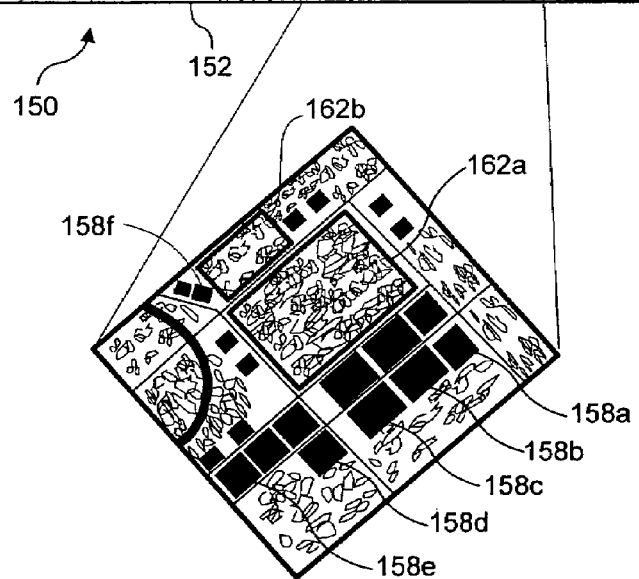
FIG. 5B illustrates an enlarged portion of the terrain texture in FIG. 5A.

FIG. 5B illustrates a magnified portion of terrain texture 152. After selecting building function 156, the designer creates one or more building rectangles 158a-158e on the terrain texture. Typically, the designer will create a building rectangle by tracing the outline of a building already shown in the terrain texture. Thus, the building rectangle defines a footprint defining the location on the tile where a 3D building object will be generated to overlay the 2D terrain texture.

Similarly, the designer may utilize a vegetation function 160 of FIG. 5A to indicate a region or location for one or more vegetation objects (i.e., selecting the type of vegetation in a specific area—not placing individual trees or plants at a specific site) should be located in the terrain texture. After selecting vegetation function 160, the designer creates one or more vegetation rectangles 162a-162b on the terrain texture, as shown in FIG. 5B. The vegetation rectangle defines an area where one or more 3D vegetation object will be generated on the 2D terrain texture.

Other functions are also available to the designer on control panel 154 of FIG. 5A. A pan function 164 enables the designer to drag the view of the terrain texture across the surface. A zoom function 166 enables the designer to magnify or reduce the size of the view of the terrain texture. A select function 168 enables a user to choose a building rectangle or vegetation rectangle for editing or for checking interferences. An interference function 170 highlights rectangles that intersect each other, which may result in overlapping 3D objects. Those skilled in the art will recognize that other types of annotation are possible. For example, a user might annotate a tile to indicate a vehicle location, a water tower location, a bridge location, etc. The types of objects that can be annotated are virtually limitless. Yet, it must be emphasized that when annotating a tile, the user is not specifying a particular object, e.g., a specific building, or a specific set of trees or plants. Instead, the user is simply indicating a location and an area of the object in the tile. Details affecting the appearance of each object that is thus annotated are consistently pseudo-randomly determined when rendered for display, as explained below.

Figure 6:
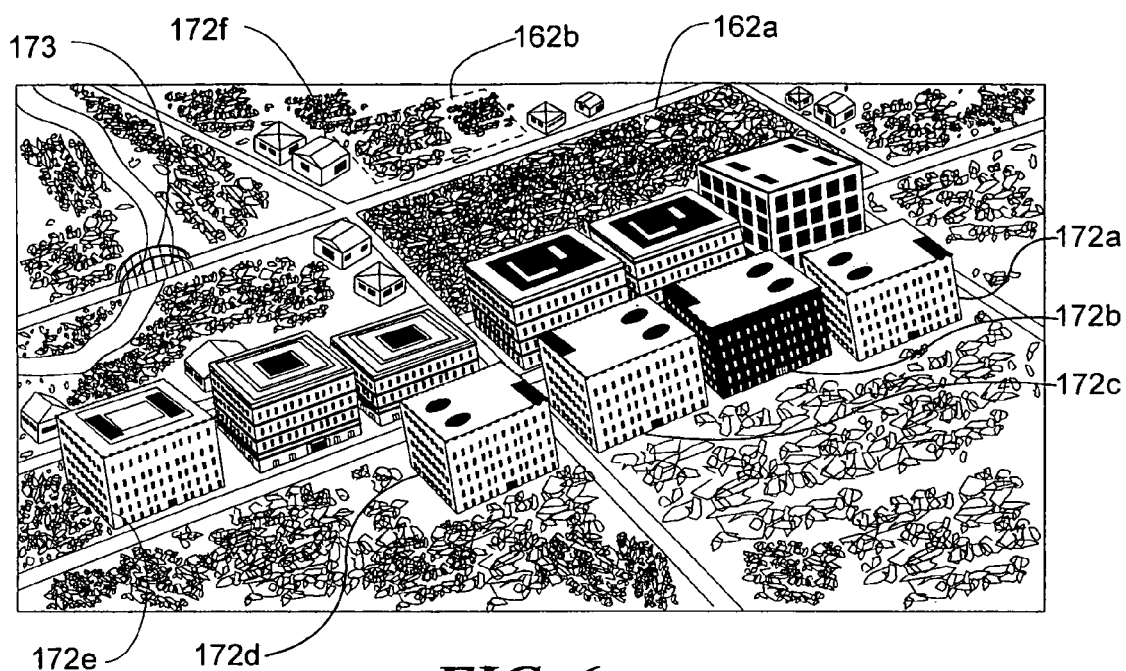
FIG. 6 is an exemplary window that would be displayed during a simulation and illustrates 3D scenery objects rendered at annotated locations on a 2D terrain texture.

FIG. 6 illustrates 3D scenery objects rendered at annotated locations on a 2D terrain texture. Specifically, building objects 172a-172f in FIG. 6 correspond to annotated building rectangles 158a-158f in FIG. 5B. Similarly, vegetation objects correspond to areas defined by vegetation rectangles, such as vegetation rectangles 162a and 162b. As indicated above, other scenery objects may also be generated from other types of annotation, such as a bridge 173. Such objects may also be generated from vector data, which are also typically used for specific terrain features such as rivers.

Figure 7:
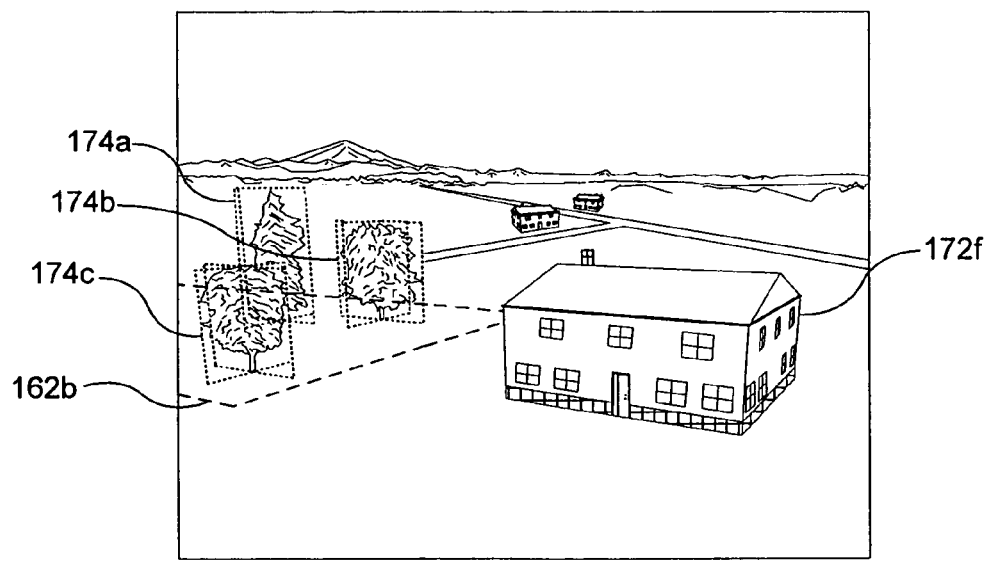
FIG. 7 is an exemplary display window showing a close-up view of 3D scenery objects rendered at annotated locations on a 2D terrain texture.

FIG. 7 illustrates a close-up view of several 3D scenery objects rendered at annotated locations on a 2D terrain texture. Building objects, such as building object 172f, are automatically generated to have stochastically determined heights, stochastically determined wall textures, and stochastically determined roof textures. The user does not specify these parameters for the buildings; they are randomly determined. Similarly, vegetation objects, such as tree objects 174a-174c, are also automatically generated to stochastically determined heights, at stochastically determined vegetation densities within the vegetation annotated regions. Again, the user does not specify these parameters for the vegetation object areas; instead, the parameters are randomly determined. While building objects are generally rendered as polygons, vegetation objects are rendered as two perpendicular planes (such as the tree objects in this Figure) with the same image of the vegetation object appearing on each plane. The two planes provide a realistic 3D image of the tree from any angle, while minimizing the computational complexity and memory requirements.

Figure 8:
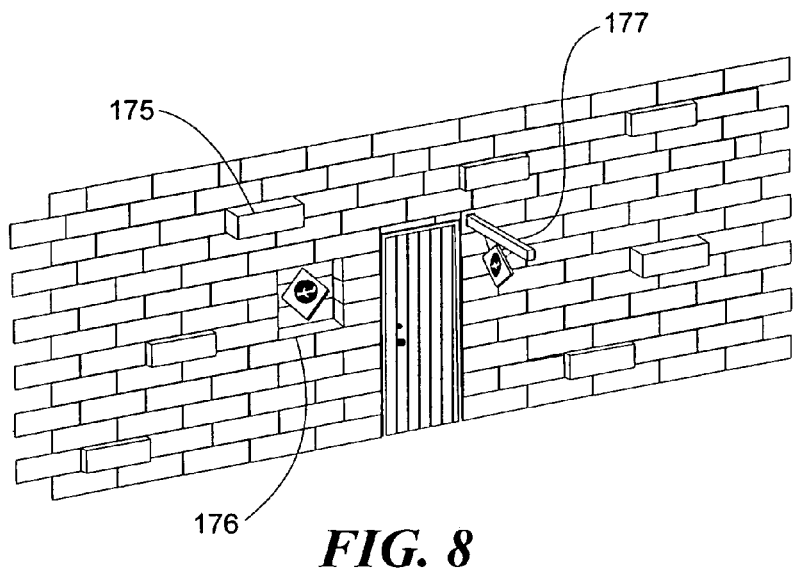
FIG. 8 is an illustration of 3D scenery objects on a walled environment.
Figure 9:
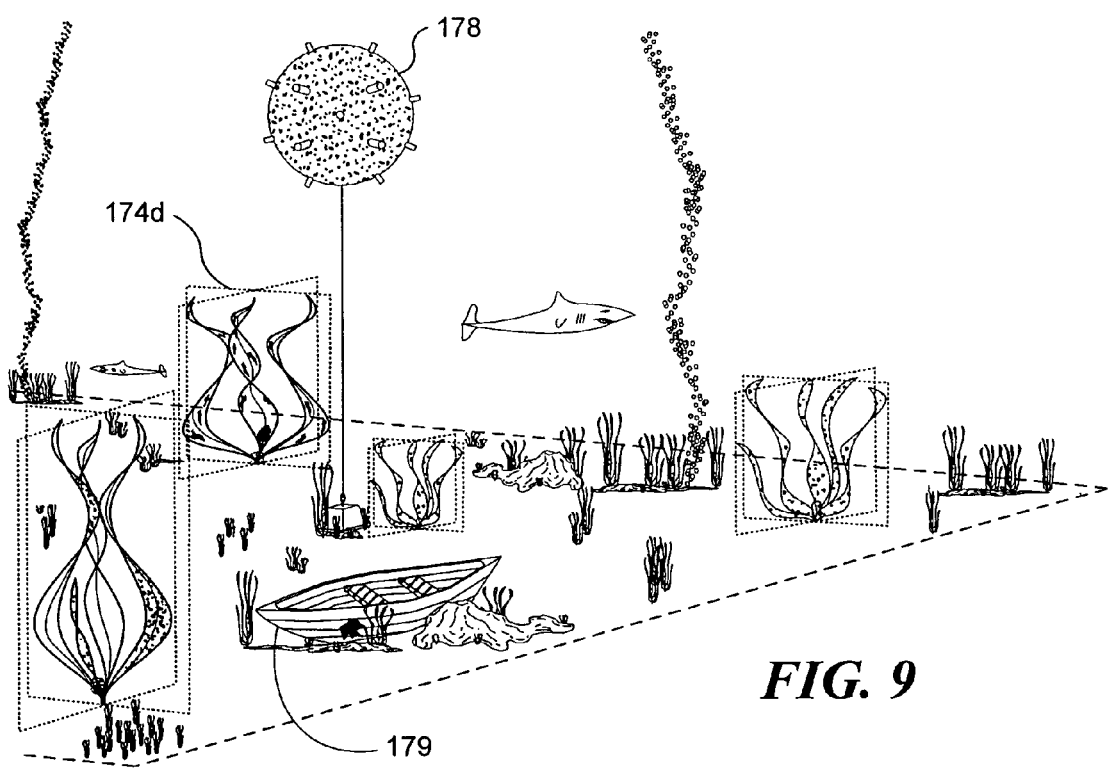
FIG. 9 is an exemplary display showing how tiles may be annotated to create undersea objects in a virtual underwater world.

FIG. 8 illustrates 3D scenery objects on a walled environment. As indicated above, the present invention may be utilized to create other types of scenery objects on other types of terrain tiles. For example, an embodiment may use annotated wall tiles to indicate the location of a protruding block 175, an indentation 176, or a sign 177. Analogously, FIG. 9 illustrates that for an underwater simulated environment, tiles may be annotated to create, for example, an undersea vegetation object 174d, an anti-submarine mine 178, or a seafloor object 179.

Figure 10:
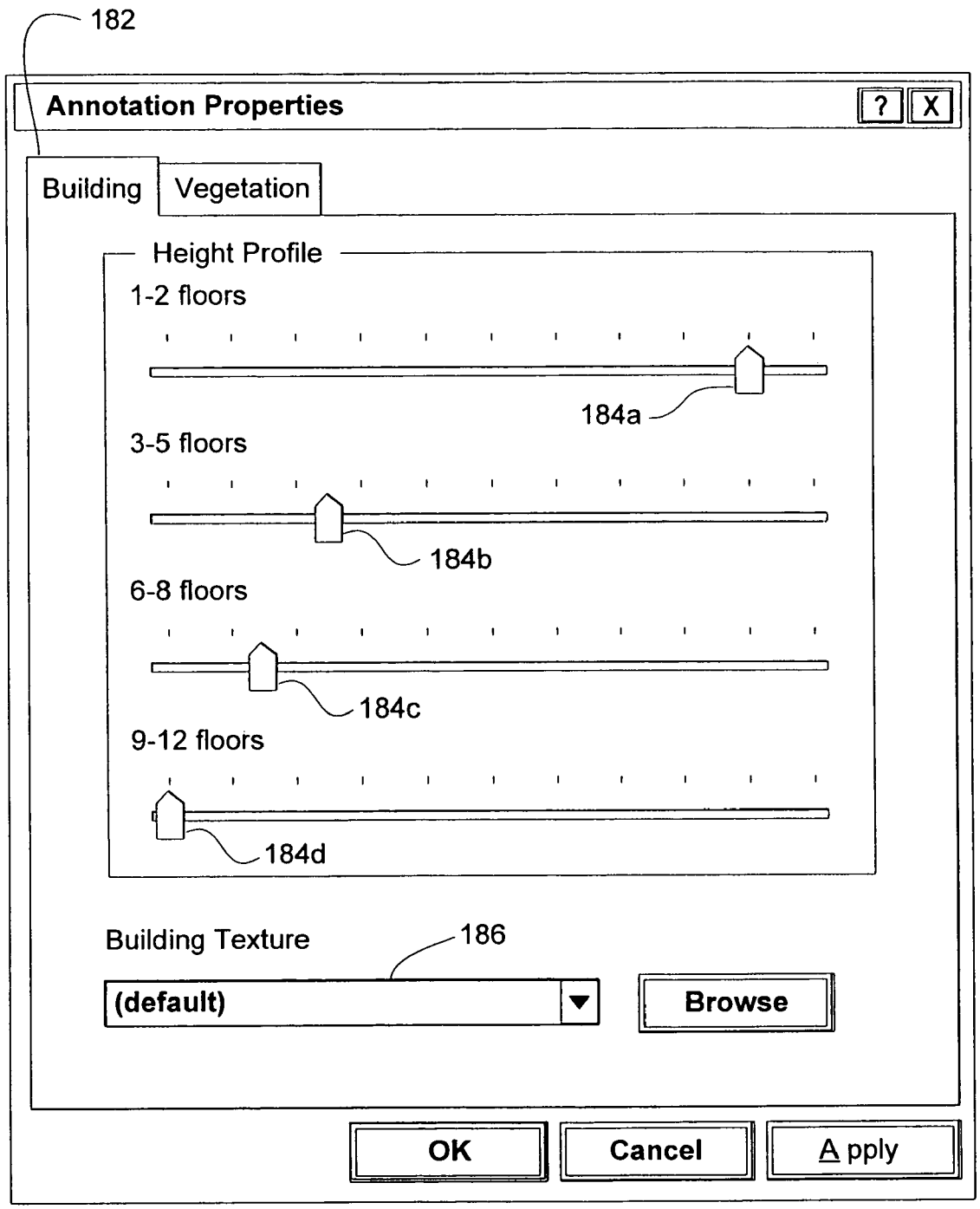
FIG. 10 is an annotation properties dialog box that may be opened through a file menu option of the annotation tool, showing the properties related to building objects.

FIG. 10 illustrates an annotation properties dialog box 180 that may be opened through a file menu option of the annotation tool. A building tab 182 is selected to display properties related to building objects. The designer may set a height profile for the building objects that will be generated on a terrain texture. For instance, the designer may move a slider 184a to designate a probability for generating building objects with one or two floors, such as houses and warehouses. Similarly, the designer may move sliders 184b-184d to designate probabilities for generating building objects with 3-5 floors, 6-8 floors, and 9-12 floors, respectively. Through a drop-down box 186, the designer may also select a building texture file that includes a variety of wall textures and roof textures that may be applied to the 3D building objects that are generated.

Figure 11:
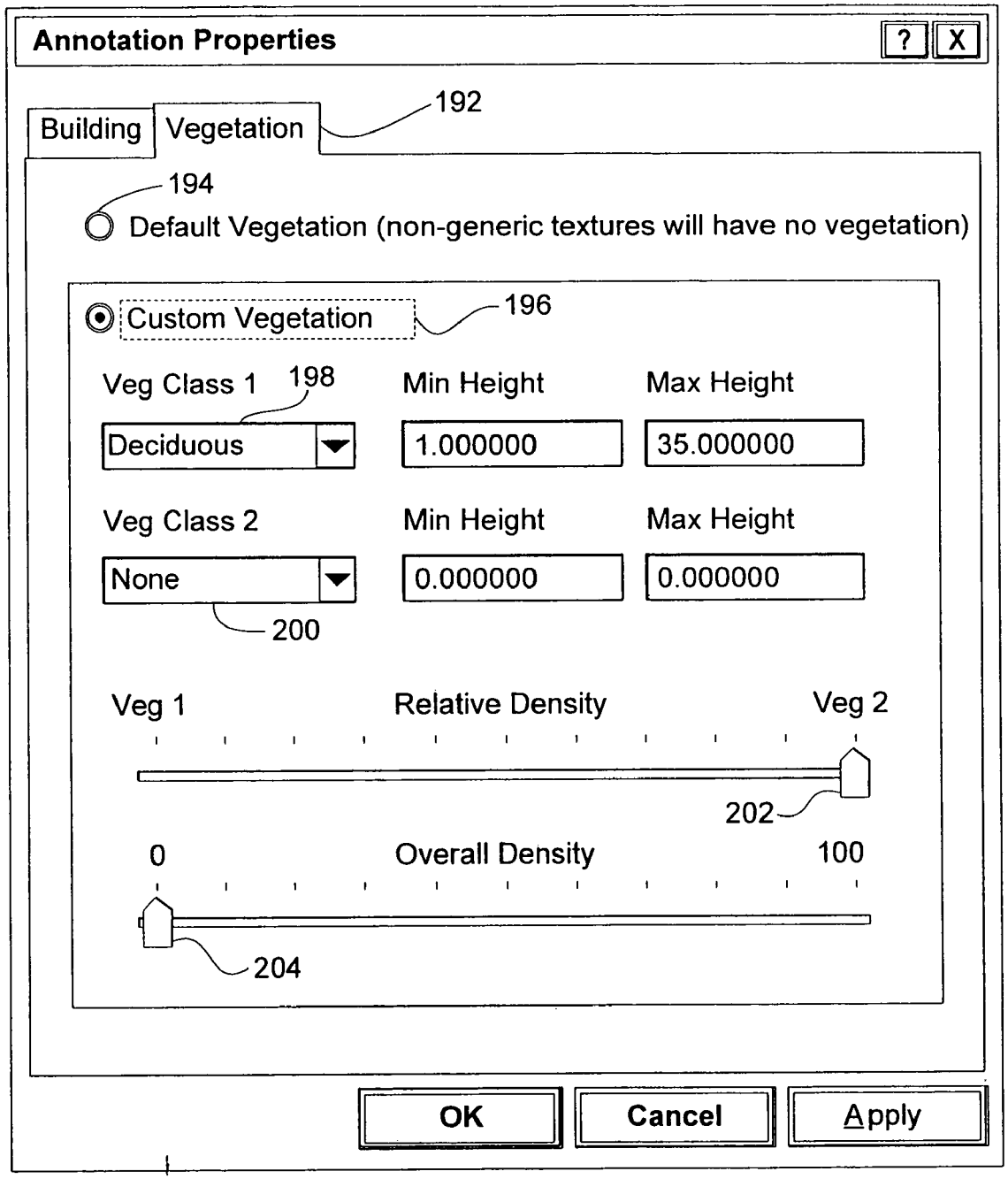
FIG. 11 is the annotation properties dialog box with a vegetation tab selected to display properties related to vegetation objects.

FIG. 11 illustrates annotation properties dialog box 180 with a vegetation tab 192 selected to display properties related to vegetation objects. The designer may select a default arrangement of vegetation through button 194. Alternatively, the designer may choose to define a custom arrangement of vegetation by selecting button 196. The designer can also add multiple classes of vegetation objects. For each class of vegetation, the designer may select a type of vegetation through a drop-down box, such as boxes 198 and 200. The designer may select from deciduous, coniferous, shrubs, palms, and other types of vegetation. Selecting a vegetation type indicates the type of texture to assign to a vegetation object. For each class, the designer may also define a minimum and maximum height of the vegetation objects, in meters.

With a slider 202, the designer may further select a relative density distribution between two vegetation classes for a vegetation object. If slider 202 is moved to the center, then an equal distribution of vegetation objects from each class will be generated. In addition, the designer may select an overall vegetation density for a vegetation with a second slider 204. The overall vegetation density corresponds to the relative amount of vegetation that will be generated in each vegetation rectangle or object that was defined on a terrain texture.

Figure 12:
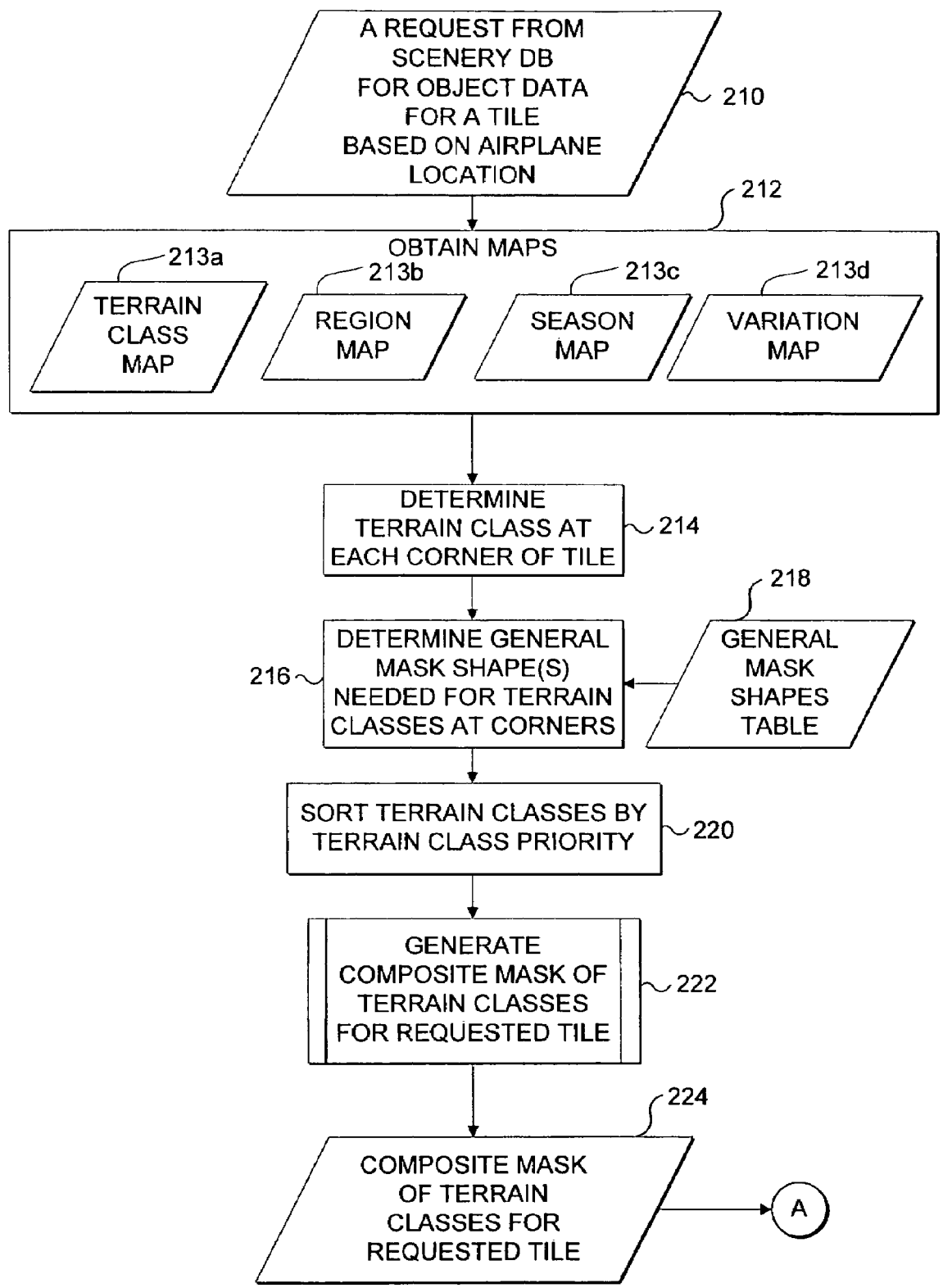
FIG. 12 is a flow diagram illustrating logic for evaluating terrain classes for a tile.

FIG. 12 is a flow diagram illustrating logic for evaluating terrain classes for a requested scenery tile. At a step 210, an Autogen module receives a request from a scenery database module for data defining automatically generated scenery objects in a tile that has come into view of the simulated airplane. Being within view of the simulated airplane is not necessarily defined by a visual view. A tile in view of the simulated airplane preferably refers to a tile within a radial distance from the location of the airplane, where the distance is sufficiently close to the simulated airplane to warrant generation of 3D scenery objects. Other tiles may be within visual view of the simulated airplane, but are outside a predefined radial distance from the simulated airplane such that generating 3D scenery objects would be of no value, because the user of the simulation would not be able to distinguish the 3D scenery objects from the underlying terrain texture of the tile. This determination reduces unnecessary computation and memory usage.

At a step 212, the Autogen module obtains map information relative to the requested tile. For example, the Autogen module obtains terrain class map information 213a that defines the terrain class at each corner of the tile, such as described with regard to FIG. 2. The Autogen module may also obtain region map information 213b that defines which region of the earth in which the tile is disposed, so that terrain textures associated with that region of the world will be selected to accurately reflect the terrain scenery around the simulated airplane's location. Similarly, the Autogen module may obtain seasonal map information 213c and tracks the time of day for the aircraft, to select textures that reflect the time of year and time of day effects on the virtual environment surrounding the simulated aircraft according to the date and time indicated by the user's computer (or as otherwise selected by the user in setting up the simulation). As discussed above, the Autogen module obtains map information 213d to select among a number of terrain textures that have the same terrain class, but have different appearances, so as to make the scenery appear natural and not as repetitive blocks of the same terrain tile.

Using the above mapping information, the Autogen module determines the terrain class at each corner of the requested tile, at a step 214. From the terrain classes at the four corners of the requested tile, the Autogen module determines, at a step 216, the general mask shape or shapes needed for combining the terrain classes at the corners of the tile. The Autogen module employs a general mask shapes table 218, such as that shown in FIG. 3. At a step 220 of FIG. 12, the Autogen module sorts the terrain classes of the requested tile by terrain class priority. As discussed above, the terrain classes with vegetation and other uninhabited terrain classes are generally prioritized at lower priority levels than terrain classes that include structures and other man-made objects.

At a step 222, the Autogen module generates a composite mask of terrain classes for the requested tile. Further details of this process are described with regard to FIG. 13 below. The resulting composite mask 224 is used to determine whether a scenery object that is associated with a particular terrain texture will be excluded by another overlapping terrain texture or by other vector data. For example, a house scenery object may be associated with a suburban terrain texture, but the house may be excluded by an overlapping city terrain texture that includes a large building at the same location within the tile as the underlying house. Alternatively, vector data defining a specific object, such as a well known landmark object (e.g., the Space Needle in Seattle) that has been manually inserted will take priority over automatically generated scenery objects associated with terrain textures. Similarly, an automatically generated scenery object may be excluded by vector data defining natural objects, such as rivers, other bodies of water, or other natural areas where man-made objects and some natural objects would not be disposed.

Figure 13:
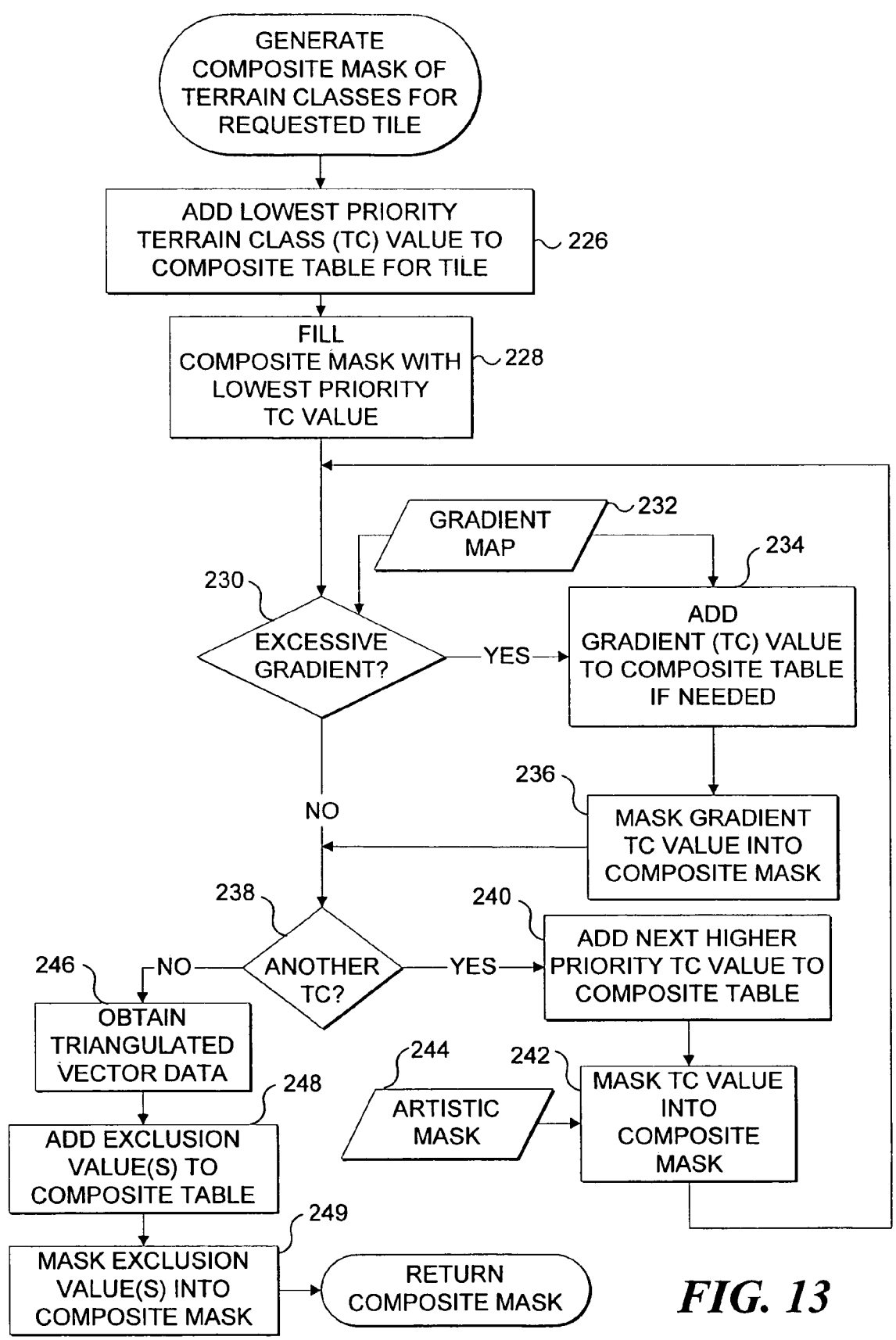
FIG. 13 is a flow diagram illustrating logic for creating a composite mask of terrain classes.

FIG. 13 is a flow diagram illustrating logic for generating a composite mask of terrain classes for a requested tile. The logic below provides further detail of step 222 in FIG. 12. At a step 226 of FIG. 13, a masking module detects the lowest priority terrain class associated with the requested tile and places a value that represents that lowest priority terrain class into a composite table for the requested tile. Preferably, the lowest priority terrain class value would be zero. At a step 228, the masking module then fills an empty composite mask with the lowest priority terrain class value. For example, the masking module will insert a plurality of zeroes into a 2D array that represents pixel locations in the requested tile. Thus, the requested tile is associated with a composite mask of terrain class values.

At a decision step 230 the masking module determines whether an "excessive" gradient exists anywhere within the requested tile. An excessive gradient is a steep change in terrain topology. The masking module may use a gradient map 232 that indicates the topology within the tile. For example, the gradient map may show that a steep cliff exists along a portion of the requested tile. In such case, any automatically generated scenery object, such as a building, would be excluded from being placed over the edge of the cliff. To affect this exclusion, the masking module adds a gradient terrain class value to the composite table at a step 234. In subsequent checks for excessive gradients, the masking module will add another (e.g., second) gradient terrain class value to the composite table if the second gradient terrain class value is different than a first gradient terrain class value. Otherwise, the masking module will not add another entry of the same gradient terrain class value to the composite table. However, if the same gradient terrain class value occurs at different locations in the requested tile, the masking module will insert the same gradient terrain class value into the composite mask at the various appropriate locations within the requested tile, as part of a step 236. Once excessive gradients have been identified, or if no excessive gradient exists, the masking module determines, at a decision step 238, whether another terrain class needs to be processed for the requested tile, based on the terrain classes determined at each corner of the requested tile. If another terrain class is associated with the requested tile, the masking module adds a next higher priority terrain class value to the composite table at a step 240. For example, the next higher priority terrain class value may be set as number one (1) to represent the next higher priority terrain class associated with the requested tile. At a step 242, the masking module then uses an artistic mask 244 to insert the next higher terrain class value into the composite mask at locations defined by the artistic mask. Specifically, the masking module refers to the general mask shapes that were determined at step 216 of FIG. 12 and selects a corresponding artistic mask that is associated with the selected general mask shape. The artistic mask, such as one shown in FIG. 3, is used to identify the locations in the composite mask where the next higher priority terrain class value will overwrite the previous lower priority terrain class value. Thus, the composite mask comprises multiple terrain class values to define the portions of the requested tiles that will be represented by each of the multiple terrain class textures. Control then returns to decision step 230 to determine if another excessive gradient is associated with the next higher priority terrain class.

Once all terrain classes associated with the requested tile have been processed, the masking module obtains triangulated vector data at a step 246. As discussed above, triangulated vector data preferably represents high priority objects such as rivers, bodies of water, landmark buildings, and other predefined objects. At a step 248, the masking module adds associated exclusion values to the composite table to represent each type of triangulated vector data. Similarly, the masking module inserts the exclusion values into the composite mask at a step 249 to define the location of the objects represented by the triangulated vector data. The composite mask is then complete and is returned to the Autogen module for further processing.

Figure 14:
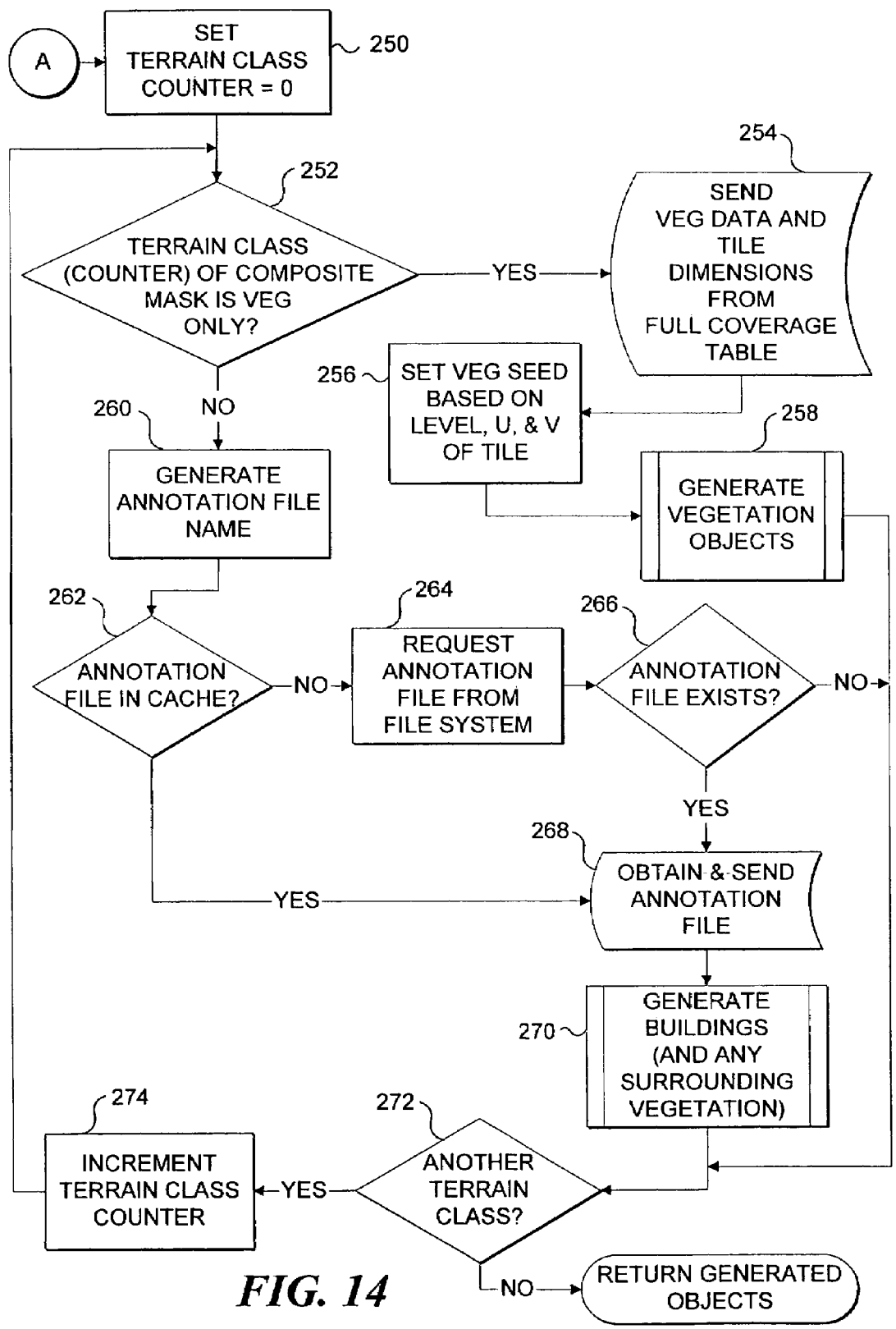
FIG. 14 is a flow diagram illustrating logic for generating scenery object data with a composite mask of terrain classes.

FIG. 14 is a flow diagram illustrating logic for generating scenery object data with a composite mask of terrain classes. At a step 250 the Autogen module sets a terrain class counter to zero. The terrain class counter will be used to track the number of terrain classes used in the composite mask. At a decision step 252, the Autogen module determines whether the terrain class of the composite mask that corresponds to the current counter number is a terrain class that includes only vegetation. For example, the forest terrain class includes only vegetation because it does not include any man-made objects, such as buildings, in contrast, for example, to the urban class, which does. If the Autogen module determines that the current terrain class of the composite mask includes only vegetation, then the Autogen module obtains vegetation data and tile dimensions at a step 254, from a full coverage table. The full coverage table lists all of the terrain classes. For those terrain classes that include only vegetation data, the full coverage table also preferably includes data defining the vegetation. The Autogen module sends the vegetation data and tile dimensions to a vegetation module that creates vegetation objects for rendering on a display. At a step 256, the Autogen module sets a seed for a random number generator, where the seed is determined repeatably as a function of the tile location, to ensure that the same vegetation objects are created each time that particular tile is processed. The Autogen module sets the seed for the vegetation based on the tile location as defined by at the current level. The seed may also be set or determined repeatably as a function of the resolution level of the tiles. In this way, equivalent tile coordinates can be distinguished by the resolution level relative to the level of detail rendered in the tile. The Autogen module then invokes the vegetation module at a step 258, to generate the vegetation objects.

If the current terrain class of the composite mask includes more than just vegetation, as determined at decision step 252, then the Autogen module generates an annotation file name at a step 260. The annotation file name is generated from a coding of the terrain class type, a variation number of that terrain class type, and a region in which the tile is disposed. The region preferably represents a portion of the Earth in this flight simulator embodiment of the present invention. At a decision step 262, the Autogen module determines whether the annotation file is already available in cache. If not, the Autogen module requests the annotation file from the file system at a step 264. At a decision step 266, the file system determines whether the annotation file exists. If not, then no scenery objects are generated for the current terrain class of the composite mask. However, if the annotation file exists, the Autogen module obtains the annotation file at a step 268, and sends the annotation file data to a buildings module at a step 270. The buildings module generates building scenery objects and any surrounding vegetation scenery objects.

Once a terrain class of the composite mask has been processed, the Autogen module determines at a decision step 272 whether another terrain class exists in the composite mask. If so, the Autogen module increments the terrain class counter at a step 274, and control returns to decision step 252 to process the next terrain class of the composite mask. Once all terrain classes of the composite mask have been processed, the Autogen module returns the data for the generated scenery objects to the scenery data base module.

Figure 15:
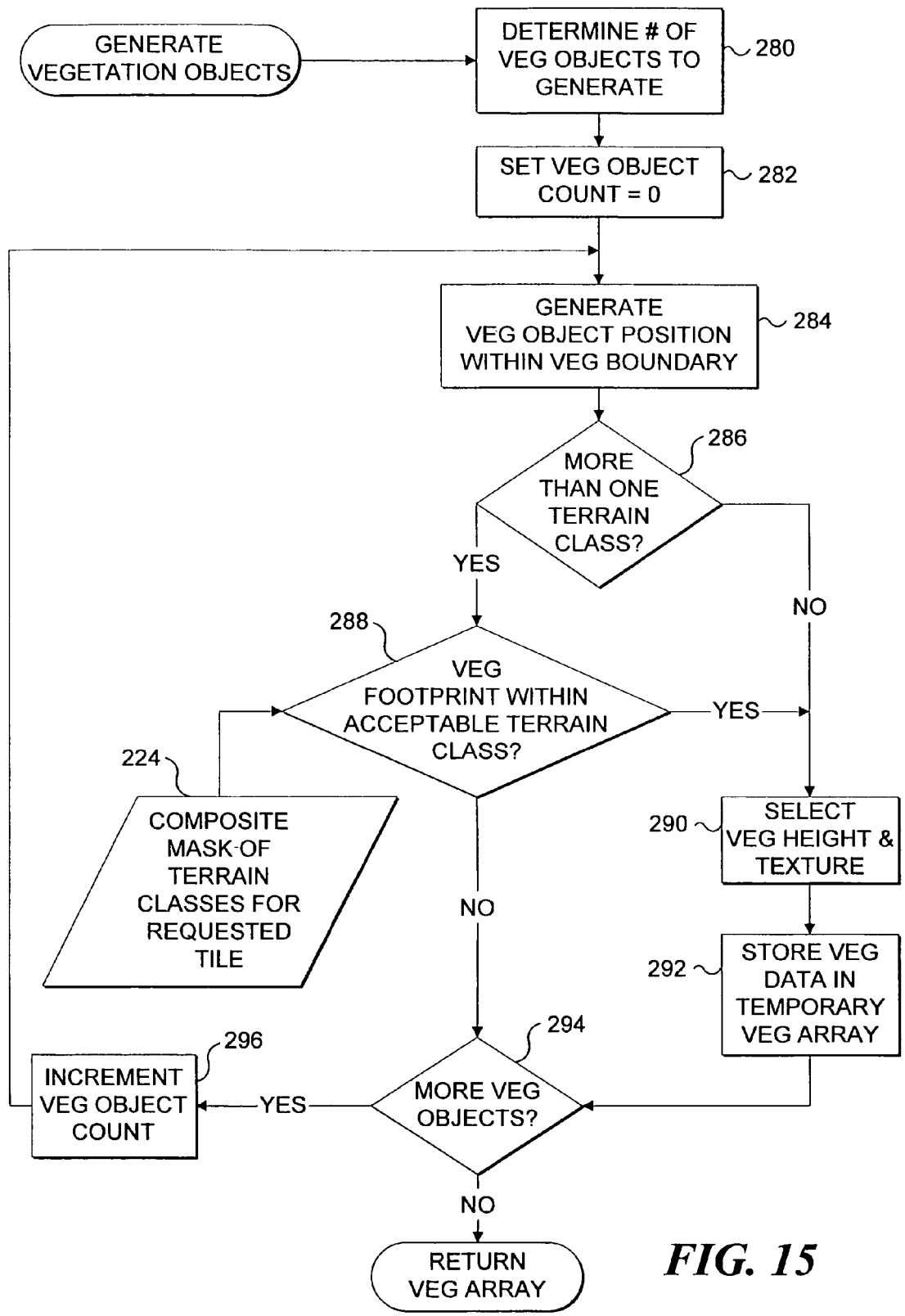
FIG. 15 is a flow diagram illustrating logic for generating vegetation objects.

FIG. 15 is a flow diagram illustrating logic for generating vegetation objects. This diagram corresponds to details of step 258 in FIG. 14. At a step 280 of FIG. 15, the vegetation module determines a number of vegetation objects to generate in the area provided. The area provided will be the area of an entire tile if the terrain class includes only vegetation. Alternatively, the area will be defined by a vegetation rectangle included in an annotation file if the terrain class includes objects other than vegetation. Thus, the logic described below can be applied to an entire tile or any smaller area that is a portion of a tile, provided that the dimensions of the area are indicated.

The number of vegetation objects that should be generated is determined based upon several parameters. One parameter includes the vegetation density selected by the designer, as discussed above. Another parameter includes the size of the area as a percent of a full tile. Yet another parameter includes a speed setting that a user can establish before running the simulation. The speed setting enables the user to select the degree of detail provided by the auto generation of scenery objects depending on the speed of the user's processor, video adapter, memory, and other pertinent hardware on the user's computer. This setting enables the user to maintain a satisfactory frame rate depending on the speed of the user's hardware. Those skilled in the art will recognize that other parameters may be included to control the number of vegetation objects that are generated. The vegetation module preferably uses these parameters to scale a default number of vegetation objects to determine the number of vegetation objects that will be generated for the given area.

At a step 282, the vegetation module sets a vegetation object count equal to zero. The vegetation module will count up to the number of vegetation objects determined above. At a step 284, the vegetation module generates a vegetation object position within the boundaries of the given area. The vegetation object position is stochastically determined based on the seed value for the vegetation object generation that was set at step 256 of FIG. 12. Utilizing this seed value each time that this tile is displayed ensures that vegetation objects will be generated at the same position within the given area each time the tile is displayed in the simulation.

At a decision step 286, the vegetation module determines whether more than one terrain class exists in the given area. For example, the vegetation object may refer to the composite table to determine whether the composite table contains only a single value. Over many parts of the Earth, and over many parts of a virtual environment surface or fictitious space, a single terrain covers much of the scenery area and there are few specific vector objects, such as rivers. Thus, it may sometimes be desirable to display many entire tiles with only auto generated vegetation, auto generated wall objects or surfaces, auto generated fictitious objects, or other auto generated objects. For instance, in cases where an entire tile is covered by only a single vegetation terrain class, and the tile includes no other vector objects, the vegetation module does not need to refer to the composite mask, because the composite mask will be filled with a single value. In this case, the vegetation module can freely generate vegetation objects over all of the tile as a function of the previously defined seed value for vegetation.

If, however, the given area includes more than one terrain class, some objects from one terrain class may overlap another terrain class. Those overlapping objects should be excluded by reference to the composite mask of terrain classes. Specifically for the flight simulator embodiment, the vegetation module refers to the composite mask 224 to determine, at a decision step 288, whether the footprint of a generated vegetation object will fall entirely within an acceptable terrain class. This step ensures that the vegetation object position and the footprint defined by a radius parameter will not overlap onto another terrain class that may not include vegetation objects at the vegetation object position. For example, since this vegetation module is also used for smaller vegetation rectangles of a suburban terrain class that includes buildings, the vegetation module ensures that a vegetation object created for a vegetation terrain class is excluded from an area covered by the suburban terrain class to ensure that vegetation objects are not created overlaying a building.

However, if the footprint of the vegetation object falls within an acceptable terrain class, the vegetation module selects a vegetation height and texture at a step 290. As with the vegetation object position, the vegetation height and texture are stochastically determined based on the seed used to determine the vegetation object characteristics. This step further ensures that the same vegetation object will always be generated at the same position whenever the given area is displayed in the simulation. At a step 292, the vegetation object position, height, and texture data are stored in a temporary vegetation array.

Once the vegetation object data are stored, or if the vegetation object would not fall within an acceptable terrain class of the composite mask, the vegetation module determines, at a decision step 294 whether more vegetation objects should be generated. As indicated above, the vegetation module continues to generate vegetation objects until the number of such objects determined at step 280 is achieved. If more vegetation objects remain to be generated, the vegetation module increments the vegetation object count at a step 296. Once the total number of vegetation objects needed to be generated has been generated, the vegetation module returns the vegetation array of vegetation data to the calling module.

Figure 16:
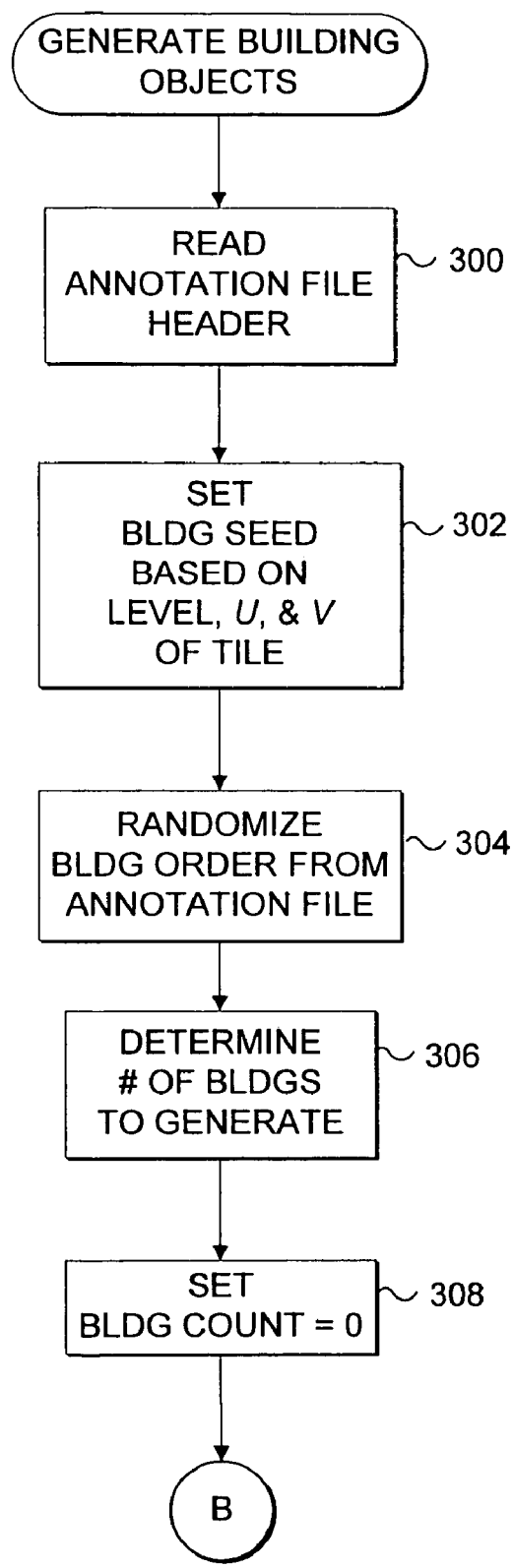
FIG. 16 is a flow diagram illustrating logic for initiating generation of building objects and surrounding vegetation objects.

FIG. 16 is a flow diagram illustrating logic for initiating generation of building objects and surrounding vegetation objects. The following logic corresponds to step 270 of FIG. 14. At a step 300 of FIG. 16, a building module reads an annotation file header that provides summary data of the annotation file when the annotation file was completed with the annotation tool described with regard to FIG. 5. Preferably, the summary data comprises a total number of buildings to be generated for the tile, a total number of vegetation objects or areas for the tile, a building texture file name, height profile data, and other summary information.

At a step 302 of FIG. 16, the building module sets a seed for building objects based on the tile location as defined by u and v coordinates. The building module also preferably sets or adjusts the seed to determine building order as a function of the tile resolution level. At a step 304, the building module then uses the seed for building objects to randomize a selection order of buildings that are identified with building footprints (i.e., size and location data in the tile for each building object) specified in the annotation file. Randomizing the order with which buildings are selected from the annotation file ensures that tiles will be different in appearance even when the same annotated terrain texture is used, as determined by the terrain class and variation number. Once the building order has been randomized, the building module determines a number of buildings to generate, at a step 306. Similar to the step of determining the number of vegetation objects, the building module determines the number of buildings to generate based on a density parameter that is selectable by the user designing the simulation. At a step 308, the building module initializes a building count variable equal to zero, so the building module can increment up to the number of building objects determined above. The logic then continues in FIG. 17, where indicated by a connector B.

Figure 17:
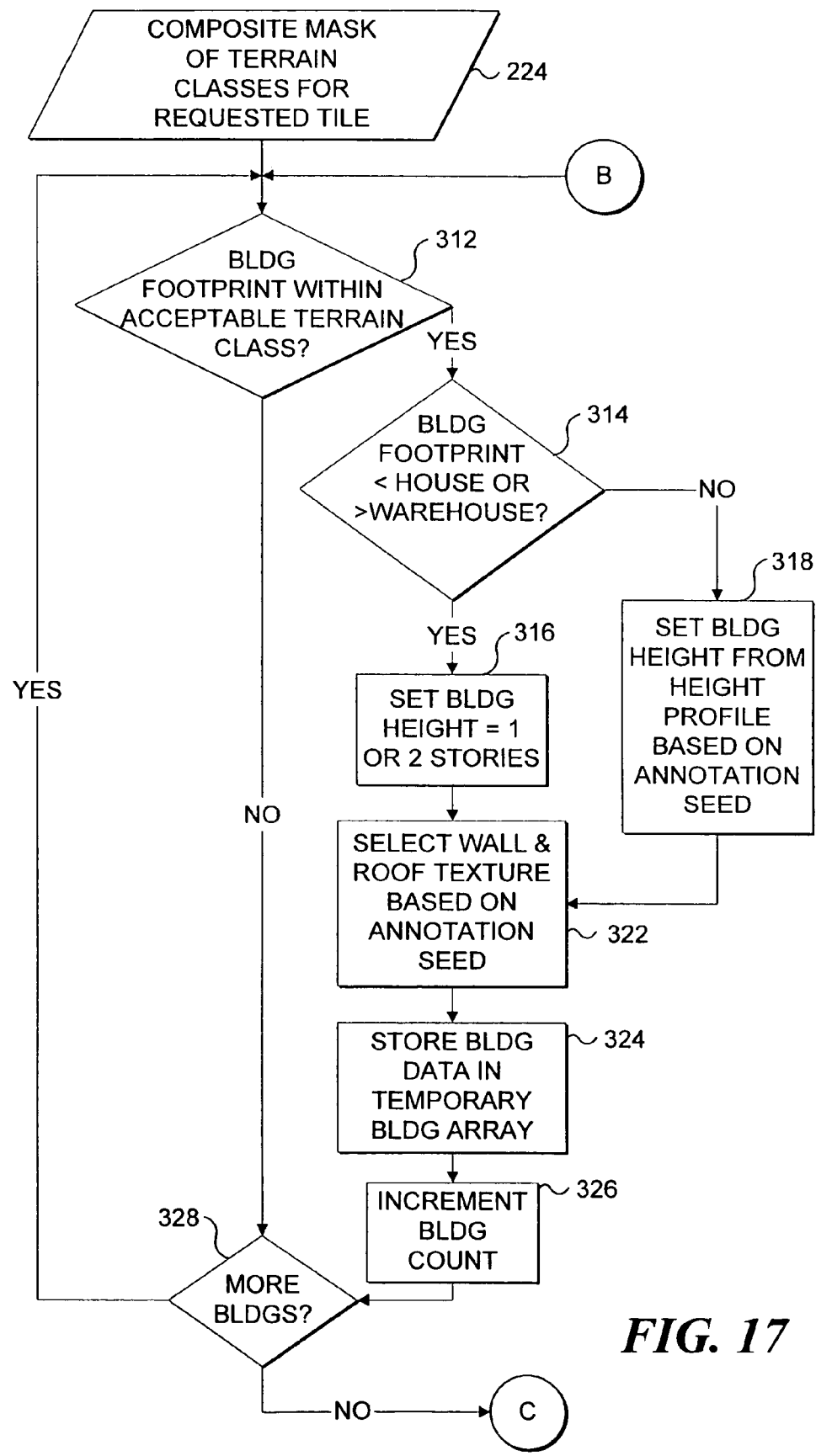
FIG. 17 is a flow diagram illustrating logic for generating building objects.

FIG. 17 is a flow diagram illustrating continued logic for generating building objects. The building module obtains the composite mask 224 of terrain classes for the requested tile. Based on the data of the annotation file defining the footprint of the current building selected from the randomized building order, the building module determines, at a decision step 312, whether the building footprint falls within an acceptable terrain class of the composite mask. An acceptable terrain class is preferably the current terrain class corresponding to the current terrain texture. If the entire footprint, as defined by the location and dimensions of the building rectangle, falls within an acceptable terrain class of the composite mask, the building module determines whether the building footprint corresponds to a very small building or a very large building, at a decision step 314. If the building module determines that the building footprint is less than a small predefined area, then the building is considered likely to be a house or other small building that will not exceed one or two stories in height. Similarly, if the building footprint is larger than a large predefined area, the building is determined to be a warehouse or other industrial building that is also unlikely to exceed one or two stories. In either of these two cases, the building module stochastically sets the building height to one or two stories at a step 316.

Conversely, if the building footprint is of a size that falls between these two predefined relatively small and large areas, the building module stochastically sets the building height, at a step 318. The building height is based on the height profile stored in the annotation file and based on an annotation seed that is a function of the building annotation location within the tile and the seed for building objects. Those skilled in the art will recognize that a variety of seed schemes can be used, including daisy chaining successive seed values from an initial seed value. Such seeding schemes enable a variety of buildings to be generated within a tile, yet ensures that the buildings are generated consistently whenever a particular tile is utilized.

At a step 322, the building module then stochastically sets a wall and roof texture to be applied to the building. This stochastic determination is also based on the annotation seed to ensure that the building objects will appear the same each time the requested tile is displayed. Preferably, each stochastic determination is made in a sequence that starts with the seed for the building objects, and this seed is not necessarily used independently for each stochastic determination. At a step 324, the building module stores the building data in a temporary building array for use in rendering the building object. The building module then increments the building count at a step 326. At a decision step 328, the building module determines whether the building count exceeds the number of buildings determined at step 306. If the building count does not exceed the previously determined number of buildings, there are more buildings to process, so control returns to decision step 312. Otherwise, control passes through a connector C to the logic of the next figure.

Figure 18:
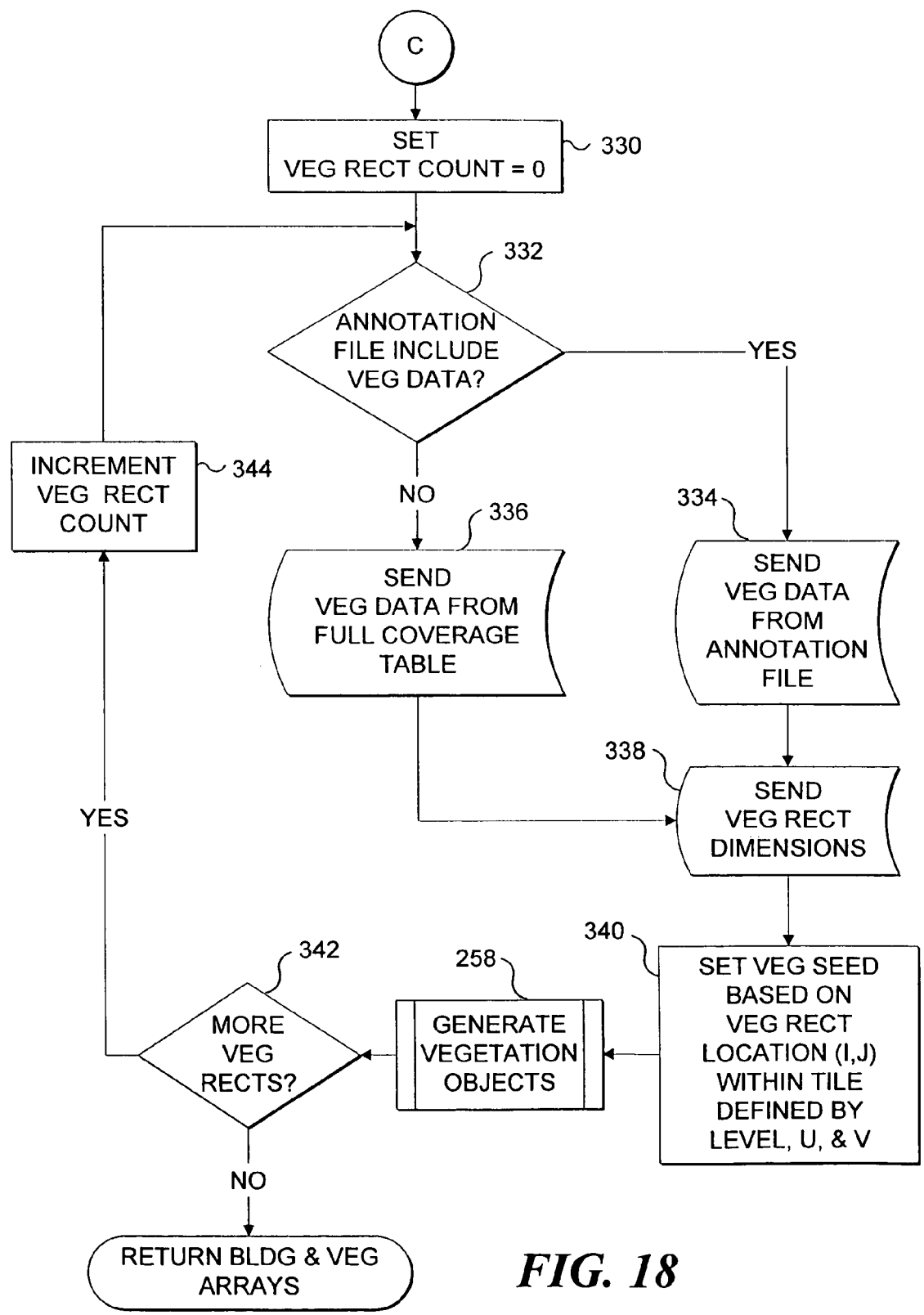
FIG. 18 is a flow diagram illustrating logic for generating surrounding vegetation objects.

FIG. 18 is a flow diagram illustrating logic for generating surrounding vegetation objects. When the predetermined number of buildings have been processed, the building module begins to process surrounding vegetation rectangles to generate vegetation objects within the vegetation rectangles. To begin, the building module sets a vegetation rectangle count equal to zero at a step 330. At a decision step 332, the building module determines whether the current annotation file includes vegetation data defining the parameters of the vegetation objects to be generated. If the annotation file includes the vegetation data, the building module sends this vegetation data from the annotation file, at a step 334, as input to the vegetation module described above. Conversely, if the annotation file does not include vegetation data, the building module obtains the vegetation data from the full coverage table, at a step 336, and sends the vegetation data to the vegetation module.

The building module also sends the vegetation rectangle dimensions to the vegetation module at a step 338. As described above, the vegetation module generates vegetation objects in any given area, whether the area is an entire tile or a vegetation rectangle that is only a small portion of the tile. At a step 340, the building module then sets a seed for the vegetation based on location, including the vegetation rectangle location within the tile, the tile location, and preferably, the tile resolution level. The building module then invokes the vegetation module 258 to generate the vegetation objects within the vegetation rectangle.

At a decision step 342, the building module determines whether more vegetation rectangles are defined in the annotation file. If more vegetation rectangles are defined, the building module increments the vegetation rectangle count at a step 344. Control then returns to decision step 332 to process the next vegetation rectangle or area. When all vegetation areas have been processed, the building and vegetation arrays are passed to the Autogen module for rendering.

Although the present invention has been described in connection with the preferred form of practicing it, those of ordinary skill in the art will understand that many modifications can be made thereto within the scope of the claims that follow. For example, a terrain texture may be annotated to include a height parameter, a wall texture parameter, or other parameters, rather than relying on the stochastic process to generate heights, wall textures, and other parameters of the resulting objects. This provides an alternate method to render objects as they actually exist on Earth from aerial photos, without having to pre-build 3D models of the objects. Accordingly, it is not intended that the scope of the invention in any way be limited by the above description, but instead be determined entirely by reference to the claims that follow.

The invention in which an exclusive right is claimed is defined by the following:

1. A method for automatically generating a unique display of scenery objects for each of a plurality of visual display tiles of a computing application by applying unique seed values for each of the one or more visual display tiles to a random number generator that generates output defining display characteristics of the scenery objects, the method comprising:
  receiving a request from a scenery module for data defining scenery objects for a tile that is included with a plurality of tiles that are each associated with a class type defined by an underlying texture, each tile also including an annotation defining one or more ranges for display characteristics of the scenery objects;
  obtaining a composite mask of the tile;
  determining a seed value for each of the plurality of tiles, wherein the seed value is a predefined value based on a location of the tile within a simulated area of the computing application and such that each tile within the simulated area comprises a different seed value;
  using the seed value for each of the plurality of tiles to automatically generate one or more display objects within each of the tiles with display characteristics that are controlled by a combination of the class type associated with each tile as well as the seed value associated with each tile, by applying the seed value of each tile to a random number generator that controls the display characteristics that are selected from the one or more ranges of display characteristics for the one or more display objects within each tile, and such that at least some tiles having similar composite masks and class types will have displayed objects that are displayed differently than object displayed by other tiles having similar composite masks and class types, and based on the use of the different seed values for each of the tiles, respectively.

2. A method as recited in claim 1, wherein obtaining the composite mask is includes the following:
- obtaining terrain class map information corresponding to the tile and that identifies a plurality of terrains corresponding to the tile;
- selecting terrain textures from a plurality of terrain textures having a same class but different appearance and that correspond to the terrain class map information;
- determining appropriate mask shapes to use in applying the terrain textures within a composite mask for the tile;
- sorting the terrain classes based on predefined prioritization rules;
- applying the terrain textures with the appropriate mask shapes and in an order defined by the prioritization rules; and
- identifying exclusion values for any areas to be excluded from containing scenery objects.

3. A method as recited in claim 2, wherein identifying the exclusion values is based on the identification of a particular texture within the composite mask.

4. A method as recited in claim 2, wherein identifying the exclusion values is based on the identification of an excessive gradient within the tile.

5. A method as recited in claim 2, wherein identifying the exclusion values is based on the identification of a triangulated vector data corresponding with a predefined object.

6. A method as recited in claim 5, wherein the predefined object comprises a building.

7. A method as recited in claim 5, wherein the predefined object comprises a body of water.

8. A method as recited in claim 2, wherein the terrain class map information is based on region information corresponding to a plurality of tiles within a defined region.

9. A method as recited in claim 2, wherein the terrain class map information is based on terrain information identified for each of a plurality of tile corners.

10. A method as recited in claim 2, wherein the terrain class map information is based on temporal and seasonal information corresponding to a particular implementation of the application.

11. A method as recited in claim 1, wherein the request for data defining scenery objects for a tile is received in response to the tile obtaining a predefined display proximity to an application object.

12. A method as recited in claim 11, wherein the predefined display proximity comprises a predefined distance of the tile to a simulated object within the application.

13. A method as recited in claim 11, wherein the simulated object comprises a vehicle.

14. A method as recited in claim 1, wherein obtaining the composite mask comprises generating the composite mask.

15. A method as recited in claim 1, wherein the display characteristics include a height of the display object.

16. A method as recited in claim 1, wherein the display characteristics include a location within the tile for displaying the display object.

17. A method as recited in claim 1, wherein the display characteristics include a density of instances in which the display object is to be displayed within the tile.

18. A method as recited in claim 1, wherein the display characteristics include a footprint of the display object.

19. A method as recited in claim 1, wherein the method further comprises:
- associating the display object at a predefined location within the visual tile;
- determining whether the display object interferes with an annotation of the tile; and
- excluding the display object from being displayed with the tile when the predefined object interferes with the annotation.

20. A method as recited in claim 1, further comprising:
- determining one of a plurality of classes at each of a plurality of points on the tile;
- prioritizing the plurality of classes to determine a priority of the classes relative to each other;
- determining a pattern of the plurality of classes within the visual tile as a function of the priority of the classes;
- identifying an area of exclusion corresponding to the pattern of the classes;
- associating the first texture with a low priority class, and associating the second texture with a high priority class; and
- overwriting the first texture with the second texture, to create the composite texture.

21. A computing system comprising one or more computer-readable storage media storing computer-executable instructions for implementing the method of claim 1.

22. A computer program product comprising one or more computer-readable storage media storing computer-executable instructions for implementing the method of claim 1.

23. A method as recited in claim 1, wherein the method further includes using a same seed value each of a plurality of times for a particular tile that is displayed and which is different than at least one other seed value that is used by at least one other tile that is displayed with the particular tile.

* * * * *